US010924180B2

(12) United States Patent
Bournes

(10) Patent No.: US 10,924,180 B2
(45) Date of Patent: Feb. 16, 2021

(54) LOW LATENCY SATELLITE COMMUNICATION RELAY NETWORK

(71) Applicant: Via Space Networks Inc., Santa Clara, CA (US)

(72) Inventor: Patrick Bournes, Santa Clara, CA (US)

(73) Assignee: Via Space Networks Inc., Santa Clara, CA (US)

( * ) Notice: Subject to any disclaimer, the term of this patent is extended or adjusted under 35 U.S.C. 154(b) by 217 days.

(21) Appl. No.: 15/971,224

(22) Filed: May 4, 2018

(65) Prior Publication Data

US 2018/0323863 A1 Nov. 8, 2018

Related U.S. Application Data

(60) Provisional application No. 62/502,403, filed on May 5, 2017.

(51) Int. Cl.
*H04B 7/185* (2006.01)
*H04B 10/118* (2013.01)
*H04B 7/195* (2006.01)

(52) U.S. Cl.
CPC ..... *H04B 7/18513* (2013.01); *H04B 7/18508* (2013.01); *H04B 7/18521* (2013.01); *H04B 7/195* (2013.01); *H04B 10/118* (2013.01); *H04B 7/18541* (2013.01)

(58) Field of Classification Search
CPC .............. H04B 7/18521; H04B 10/118; H04B 7/18513; H04B 7/18508; H04B 7/195; H04B 7/18541
See application file for complete search history.

(56) References Cited

U.S. PATENT DOCUMENTS

| 5,561,837 A | 10/1996 | Muller |
| 6,446,905 B1 | 9/2002 | Campbell |
| 7,526,206 B1 | 4/2009 | Rolenz |
| 7,796,986 B2 | 9/2010 | Karabinis |
| 2005/0022500 A1 | 2/2005 | Buehler |
| 2006/0167619 A1* | 7/2006 | Arethens .............. G05D 1/0077 701/120 |
| 2008/0247351 A1 | 10/2008 | Dankberg |
| 2012/0302160 A1 | 10/2012 | Silny |
| 2014/0016941 A1* | 1/2014 | Coleman ............ H04B 7/18521 398/121 |
| 2015/0295638 A1* | 10/2015 | Keremedjiev ........ H04W 36/32 455/7 |

* cited by examiner

Primary Examiner — Mandish K Randhawa
(74) Attorney, Agent, or Firm — Ricky Lam

(57) ABSTRACT

Methods and systems for free space communication comprising one or more satellites that may provide a continuous communication link between two or more terminals are disclosed. A first satellite may be configured to send and/or receive data signals from a first terminal through a first link, and a second satellite may be configured to send and/or receive data from a second terminal through a second link. The first satellite and the second satellite may be coupled through a crosslink. The satellites and the terminals may be positioned at a minimum latitude threshold in order to take advantage of the decreasing circumference of the earth at increasing latitudes. The system and the method may comprise dividing the communication pathway between into a plurality of smaller segments, which when linked together approximate an optimal pathway for low latency and enable maintaining of higher bandwidth between the two terminals.

18 Claims, 14 Drawing Sheets

LOW LATENCY SATELLITE COMMUNICATION RELAY NETWORK

CLAIMS OF PRIORITY

This patent application is a continuation-in-part and claims priority from:
(1) U.S. provisional patent application No. 62/502,403, entitled 'Low latency satellite communication relay network', filed May 5, 2017.

FIELD OF TECHNOLOGY

This disclosure relates generally to techniques for achieving low latency communication with free-space communication data relay between two or more locations.

BACKGROUND

Traditionally, fiber optic cables are placed on the ocean floor to connect multiple land masses, and are also known as submarine cables. These submarine cables can stretch for thousands of kilometers withstanding harsh underwater environment, and may require multiple repeaters and amplifiers to maintain data integrity from one end-point to another. For example, the current state of the art in submarine communication cables includes the AC-1 cable from New York City to London, with an estimated round-trip latency of 64.8 ms. The latency of intercontinental terrestrial, e.g., submarine, communication cables, however, is driven by the speed of light through fiber. The speed of light through a fiber is roughly $2.044 \times 10^8$ m/s. In contrast, the speed of light through the atmosphere, e.g., air, is roughly $2.989 \times 10^8$ m/s, approximately 30% faster.

Several attempts have been made to establish a space-based laser communication network. Typically, such a network would be designed around a backbone of LEO, MEO, and/or GEO satellites with inter-satellite links, and laser links to other spacecrafts and to airborne platforms and ground sites. Geostationary earth orbit (GEO) communication satellites have inherently high latency, and offer coverage of a reasonably large fraction of the Earth per satellite but have long communication paths (altitude of 36,000 km) resulting in a signal latency of at least 120 ms per path. Additionally, GEO satellites are generally restricted to radio frequency signals, which due to regulations limit available bandwidth to a range of hundreds of MHz to a few GHz. Furthermore, deploying GEO satellites is far more expensive than deploying LEO or MEO satellites. Low earth orbit (LEO) satellites are often deployed in satellite constellations. Because the coverage area provided by a single LEO satellite only covers a small area that moves as the satellite travels at high angular velocity needed to maintain its orbit, a plurality of LEO satellites are often needed to maintain continuous coverage over a larger area. One benefit of using LEO satellites is the ability to provide low latency broadband telecommunications compared to GEO satellites. Medium earth orbit (MEO) satellites may also provide a solution for overcoming the latency challenge in GEO constellations. MEO is the region of space around the Earth above LEO (altitude of 2,000 km or less) and below geostationary earth orbit.

Traditional satellite communication constellations are dedicated to maximizing continuous end to end global coverage to reach as many users around the global, such as, e.g., Iridium, Globalstar, OneWeb, and LeoSat. While this constellation design is aimed for end-to-end communication from any point on the globe, and to ultimately serve many users to any other point, there are two inherent deficiencies with this generalized approach. If two communication endpoints are well known then this constellation design (1) does not achieve the minimum latency between two points of communication at the given altitude as needed for ultra-low latency or real-time applications, such as, e.g., financial transactions and robotic surgery, and (2) does not minimize the variability in the maximum and minimum latencies between satellite to satellite communication hand offs between satellites in different orbits and at different orbit locations. Since terrestrial end point locations would be undefined ahead of time in such a network, the system does not take advantage of known variables, such as, e.g., geography, and weather. For example, with high frequency financial transactions, information asymmetry enables traders to outmaneuver the market and a trader who has knowledge of what the other markets are doing before other traders may obtain a benefit from such knowledge. Additionally, three quarters of the earth's surface is ocean, and population distribution is non-uniformed, therefore equal, uniform coverage of the globe is inefficient. With the increasing need for low latency satellite communications, there is a persistent need in the art for a highly efficient system and method for providing an extensible high bandwidth communication satellite network.

SUMMARY

In one aspect, the present invention discloses a system and a method for free space communication comprising one or more satellites that may provide a continuous communication link between two or more terminals. A constellation of two or more satellites configured in a plurality of orbital planes may be disposed at predetermined distance and/or altitude intervals and may be communicatively coupled to form a sequential and bi-directional pathway at a low earth orbit (LEO) or a medium earth orbit (MEO)—below the geostationary earth orbit (GEO) of approximately 36,000 km. Data may travel between the terminals along the communication pathway, forming a data relay. A first satellite may be configured to send and/or receive data signals from a first terminal through a first communication link, and a second satellite may be configured to send and/or receive data from a second terminal through a second communication link. The first satellite and the second satellite may be coupled through a communication crosslink. Further, additional satellites may be used to increase communication distances and/or to optimize the pathway for high-bandwidth and low-latency data transfers. Although the present disclosure is related to a constellation of satellites, the invention is not so limited and those of ordinary skill in the art can recognize that it can be implemented with any type of high-altitude platform, such as, e.g., atmospheric balloons, aerial vehicles or space vehicles.

In another aspect, the present invention discloses a system and a method for high bandwidth and low latency data transfer in a determined optimal pathway of a satellite constellation network. The system and the method may comprise dividing the communication path between two terminals into a plurality of smaller segments, which when linked together approximate an optimal pathway for low latency between the two terminals and enable maintaining of higher bandwidth between the two terminals. In order to achieve minimal variability in latency, the approximation of the optimal pathway may further be required to meet or exceed a minimum accuracy threshold, in addition to optimization of variable portions of the path, such as, e.g., variations in terrestrial to non-terrestrial transmission links at each end of the communication path. The system may require at least two non-terrestrial satellite nodes; however, additional satellites may further reduce latency and variability as a plurality of segments between intermediate nodes may allow for closer approximation of the optimal pathway between the nodes in communication with the terrestrial terminals. In other words, the accuracy and/or precision of the approximation of the optimal pathway and variability thereof may be directly proportional to the number of satellites in the constellation. In some embodiments, the optimal pathway may be the shortest path, such as, e.g., a path resembling a straight line between two terminals. In other embodiments, the optimal pathway may be a theoretical shortest path, such as, e.g., a mapped path that takes into consideration the geography data, shape data, and/or weather data of the earth. In essence, by using a system and a method for piece-wise path optimization through coordinating and synchronizing communications between satellite nodes, lower latency and variability in latency may be achieved.

In other aspects, the use of many smaller segments may enable a higher bandwidth through the pathway by allowing higher bandwidth to be maintained within each segment. In essence, since bandwidth of a path segment operating at a constant transmitted power falls off as the path segment increases in length such that bandwidth is inversely proportional to length, by using more short segments to create a path, the bandwidth across a multiple segment path can be maintained at a higher level without the need for greater transmitted power. Furthermore, if each of these segments adds minimal latency to the overall path being traversed, then the use of more short segments to maintain high bandwidth does not significantly add to the latency or variability of latency in traversing the communications path.

After the determination of an optimal pathway, the system and the method of the present invention may comprise determining each satellite's trajectory, orientation and/or position relative to other satellites of the same constellation, such that the one or more transceivers and/or the one or more antennas of the satellites are fixed in position and do not require adjusting or steering to communicate with neighboring satellites. In some embodiments, the present invention is not so limited and adjusting or steering of the one or more transceivers and/or one or more antennas may provide proper alignment of the communication pathway. The determination of the satellite's trajectory, orientation and/or position may be based on aligning with the closest approximation of the optimal pathway between two target terminals. The satellites may then be launched into orbit and their orbital positions coordinated such that they pass in the vicinity of the closest approximation of the optimal pathway, and therefore minimizing latency and variability in latency during data transfer. In some embodiments, the satellites may be configured to provide continuous communication coverage between two or more terminals located at predetermined latitude. For example, to take advantage of the decreased circumference or radius of parallels of latitude as approaching either the South Pole or the North Pole, e.g., increasing absolute value of latitude, the satellites may communicate to terminals located at or above, e.g., 30-degrees in the north or south directions.

In yet another aspect, the present invention discloses a system and a method for establishing a communications pathway along a multi-link free-space path comprising continuously moving nodes that may be based solely on geographic location information of the source and destination points, instead of information about nodes outside of the geographic region of the free-space path or content or metadata, such as, e.g., date, time, headers of the information content, destination address information, and other information that may permit the destination to be searched, or which may require analysis or interpretation of the information content. The system and the method of the present invention may forward data onto the next satellite in an adjacent orbital plane in the communication pathway until it reaches the last satellite, which may be closest to the destination terminal, without analyzing information about satellites outside of the free-space path or without regard to determining communication content.

In other words, data entering a geographically defined region in space at one satellite is simply retransmitted to the next satellite with only signal conditioning which avoids introduction of latency or signal propagation delays from analysis of relative position information about the satellites to determine the next node to receive the data and avoids introduction of latency or signal propagation delays from analysis of signal content, or transduction of the communications signal from one electromagnetic form into another electromagnetic form that introduces latency or signal propagation delays as the data is passed on to the next node in the geographically defined region in space, e.g., within the communication path or channel. This approach is used to reduce or eliminate delays introduced into a communications chain due to traditional processing of data to establish a routing path, such as, e.g., analyzing, interpreting, compressing, and encrypting or decrypting elements of the communications data to determine how to forward the data along the chain of moving nodes based on content in the data, e.g., destination address information or such as analyzing relative positions of satellites to determine if path changes are required based on changes in relative position. The data sequence may be amplified or the signal electrically conditioned, such as, e.g. filtered to remove noise, but it is not processed in any fashion that evaluates or uses content to make decisions. In addition, downlinking of the data being communicated to the destination terminal from the last satellite may also be performed independent of communication content or traffic information, and may be based on the geographic location relative to the destination terminal and/or electromagnetic visibility of communication devices that are at the destination.

BRIEF DESCRIPTION OF THE DRAWINGS

Example embodiments are illustrated by way of example and are not limited to the figures of the accompanying drawings, in which, like references indicate similar elements.

DETAILED DESCRIPTION

Disclosed are a system and a method for optimizing free-space communication data relay between two or more locations for specific communications parameters such as, but not limited to, transit latency and variability in transit latency. Although the present embodiments have been described with reference to specific example embodiments, it will be evident that various modifications and changes may be made to these embodiments without departing from the broader spirit and scope of the various embodiments. In addition, the components shown in the figures, their connections, couples, and relationships, and their functions, are meant to be exemplary only, and are not meant to limit the embodiments described herein.

In at least one embodiment, the present invention discloses a system and a method for free space communication comprising one or more satellites that may provide a continuous communication link between two or more terminals. A constellation of two or more satellites configured in a plurality of orbital planes may be disposed at predetermined distance and/or altitude intervals and may be communicatively coupled to form a sequential and bi-directional pathway at a low earth orbit (LEO) or a medium earth orbit (MEO)—below the geostationary earth orbit (GEO) of approximately 36,000 km altitude. Data may travel between the terminals along the communication pathway, forming a data relay. A first satellite may be configured to send and/or receive data signals from a first terminal through a first communication link, and a second satellite may be configured to send and/or receive data from a second terminal through a second communication link. The first satellite and the second satellite may be coupled through a communication crosslink. Further, additional satellites may be used to increase communication distances and/or to optimize the pathway for high-bandwidth and low-latency data transfers. Although the present disclosure is related to a constellation of satellites, the invention is not so limited and those of ordinary skill in the art can recognize that it can be implemented with any type of high-altitude platform, such as, e.g., atmospheric balloons, aerial vehicles or space vehicles.

Figure 1A:
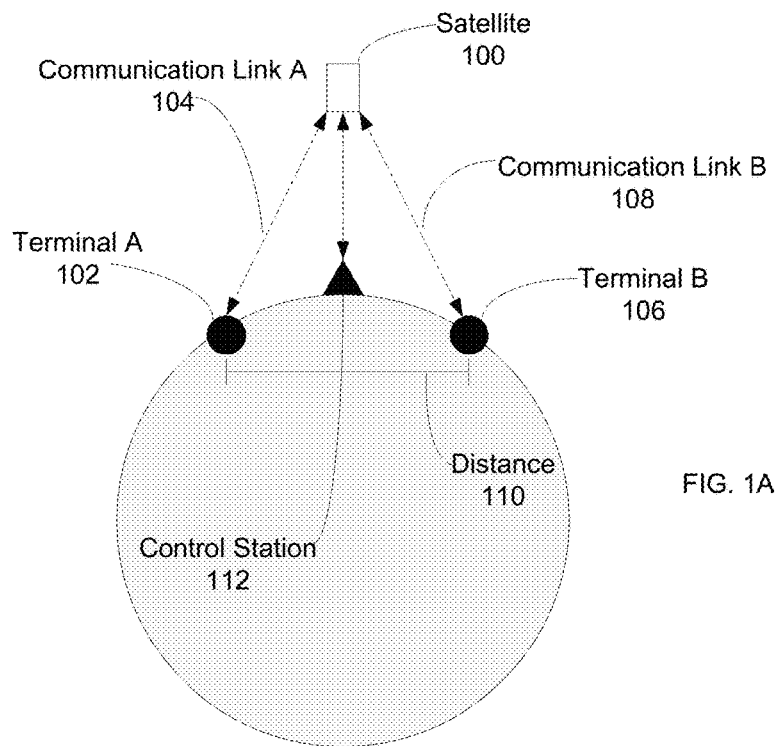
FIG. 1A illustrates a communication relay system comprising a single satellite.

FIG. 1A illustrates a communication relay system comprising a single satellite, according to at least one embodiment. Satellite 100 may be a member of a constellation of satellites that may be configured to provide continuous coverage between geographic areas. Satellite 100 may be communicatively coupled to terminal A 102 through communication link A 104, and may also be communicatively coupled to terminal B 106 through communication link B 108. Communication link A 104 and communication link B 108 may comprise bi-directional optical and/or radio frequency (RF) transmission pathways, such that data may travel from terminal A 102 to terminal B 106, or vice versa. Additionally, data may be uplinked and/or downlinked between satellite 100 and either terminal A 102 or terminal B 106 when there is electromagnetic visibility between communicating elements of satellite 100 with the respective terminal. Distance 110 may be a distance between terminal A 102 and terminal B 106 between which data travels, and may be limited by communication visibility.

Satellite 100 may comprise one or more uplink/downlink transceiver and/or one or more RF antenna to communicate with terminal A 102 and terminal B 106. Optical communication may be less susceptible to interference and harder to jam than RF communication due to narrower optical beam widths compared to radio frequency beam widths; however, optical communication may be more vulnerable to weather conditions, such as moisture in the atmosphere that may scatter or distort optical waves, limiting data reliability. After data has reached an endpoint at either terminal A 102 or terminal B 106, it may then be delivered to an end user location, such as, e.g., a financial services server or a terrestrial communication network.

Terminal A 102 and terminal B 106 may comprise one or more transceivers operating in multiple frequencies, or a single frequency with different polarizations. Terminal A 102 and terminal B 106 may also comprise a gimbal system or phased array for steering and tracking of individual satellite communication links during each pass, and may be controlled by a server comprising a memory and a processor configured to maintain continuous connectivity between terminal A 102 and terminal B 106. In some embodiments, terminals may be fixed terrestrial facilities, and may also be mobile, such as, e.g., a ground vehicle; airborne, such as, e.g., a manned or an unmanned aerial vehicle or a hot-air balloon; maritime, such as, e.g., an ocean vehicle or platform; and/or space-based, such as, e.g., another satellite.

The communication relay system may comprise a control station 112 communicatively coupled to a memory and a processor configured to control lateral, vertical and rotational movements of satellite 100. On-board propulsion and attitude control systems of satellite 100 may be used to maintain optimal satellite orientation and position for reduced data transfer latency. In some embodiments, control station 112 may not be needed and control functions of satellite 100 may be embedded within.

Figure 1B:
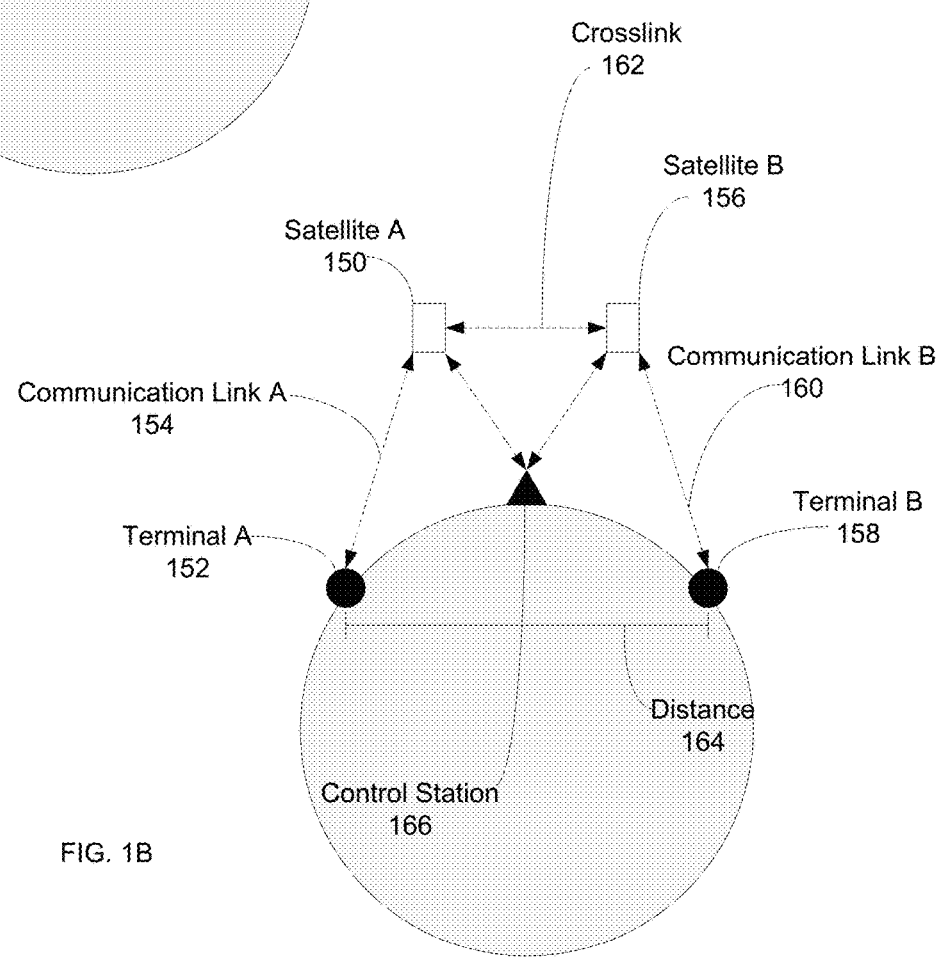
FIG. 1B illustrates a communication relay system comprising a plurality of satellites, according to at least one embodiment.

FIG. 1B illustrates a communication relay system comprising a plurality of satellites, according to at least one embodiment. Satellite A 150 may be communicatively coupled to terminal A 152 through communication link A 154. Satellite B 156 may be communicatively coupled to terminal B 158 through communication link B 160. Satellite A 150 and satellite B 156 may comprise one or more transceivers and/or one or more antennas and may be communicatively coupled to each other through inter-satellite crosslink 162. Crosslink 162 may provide bi-directional optical and/or RF transmission to form a complete pathway for data transfer between terminal A 152 and terminal B 158. The configuration in the present figure may permit wider separation of terminals compared to the configuration of FIG. 1A, such that distance 164 between terminal A 152 and terminal B 158 is larger than that of distance 110 of FIG. 1A.

Although two satellites are shown in the present figure, any number of satellites can be employed in the communication system, in which case a plurality of inter-satellite crosslinks can be used to transmit information or data from satellite A 150 that receives uplink data from terminal A 152 to satellite B 156 that sends downlink data to terminal B 158. In addition, the communication relay system may be configured to be scalable and/or reconfigurable, such that individual satellites of a constellation in orbit can be added, removed, re-oriented and/or re-positioned while maintaining continuous connectivity between terminal A 152 and terminal B 158. The system may also be configured to comprise extra or redundant satellite nodes or communication paths, such as used to make new connections before old ones are dropped in order to maintain continuous connectivity as the satellites orbit around the earth.

In some embodiments, the inter-satellite crosslink 162, communication link A 154, and/or communication link B 160, whether comprising RF, optical, millimeter, terahertz and/or another wavelength, may comprise a plurality of different frequencies, or a single frequency with different polarizations used for sending and receiving data to prevent transmission interference or crosstalk. The plurality of wavelengths may be used at the same time, in the same direction to achieve redundant transmission affected differently by the space medium and/or interference, to achieve better control and coordination between satellites, and/or to increase throughput or bandwidth of any of the inter-satellite links. Data transfer rate may be increased through frequency division multiplexing and/or differences in polarization when employing a plurality of wavelengths or polarizations in the communications channel.

The communication relay system may comprise a control station 166 communicatively coupled to a memory and a processor configured to control lateral, vertical and/or rotational movements of satellite A 150 and satellite B 156. Onboard propulsion and attitude control systems of satellite A 150 and satellite B 156 may be used to maintain optimal satellite orientation and/or position for reduced data transfer latency. In addition, control station 166 may determine an optimal data routing path among a constellation of satellites based on current data communication loads through the network. In some embodiments, control station 166 may not be needed and control functions of satellite A 150 and satellite B 156 may be embedded within the respective satellite. For example, satellite A 150 and satellite B 156 may autonomously monitor themselves by communicating their statuses to each other and/or to other neighboring satellites, and may route or select an appropriate communication path in real time.

Figure 2A:
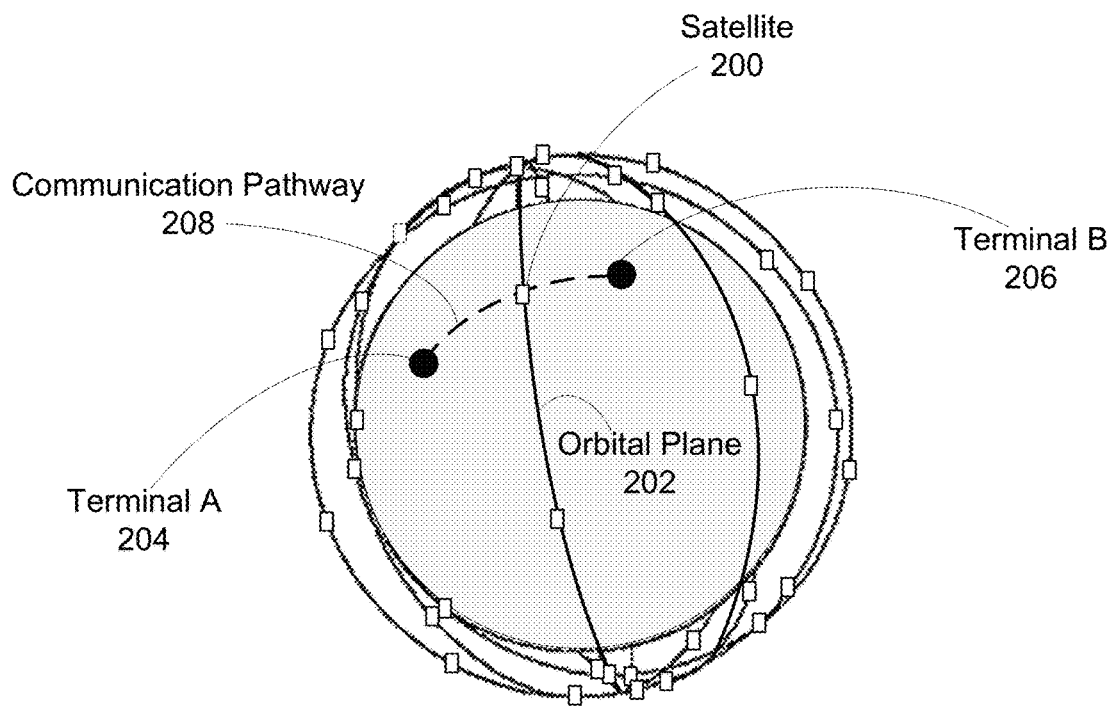
FIG. 2A illustrates a satellite constellation network.

FIG. 2A illustrates a satellite constellation network, according to at least one embodiment. The network may comprise one or more satellite 200 disposed in one or more near-polar orbital plane 202 orbiting the earth, and configured to transmit data between terminal A 204 and terminal B 206 through bi-directional communication pathway 208. Orbital plane 202 may permit satellite 200 to fly over specific areas at predetermined time intervals and predetermined terrestrial locations and, therefore, to connect terminal A 204 with terminal B 206 located at various locations around the world. Satellite 200 may be configured to receive an uplink signal from terminal A 204 when it is within electromagnetic visibility of terminal A 204, and may retransmit the signal to another satellite or to terminal B 206 when it is within electromagnetic visibility of the other satellite or terminal B 206.

In general, a plurality of satellite 200 may be separated by a distance of 1,000 km or more. Due to the long range communication, satellite 200 may comprise directional optical and/or RF transmission beams. The use of directional beams may require that the transmitter of the transmitting satellite point at the receiver of the receiving satellite, and the receiver of the receiving device point at the transmitter of the transmitting satellite. Such directional beams may comprise widths of less than, e.g., 10-degrees for an RF transmission or less than, e.g., one-degree for an optical transmission. Because the optical signal is highly directional, multiple receiving telescopes can be co-located without interfering with one another. As the number of network satellites in orbit increases, there will be an increasing probability of two (or more) satellites simultaneously passing within view of a single terminal or ground station. With multiple receiving telescopes at any ground location, each can be trained on a different passing network satellite. Since the communication channel is optical, the field of view can be quite small, allowing separate telescopes to track and receive data from different satellites without interference.

The types of constellations that can be implemented is not limited to the present exemplary embodiment, but can be extended to other types, such as, e.g., varying numbers of satellites, orbital planes, distances between satellites, and/or orbital inclinations. The network may be scalable and reconfigurable such as by having the capability of adding satellites to an existing constellation of satellites. This can be done to replenish an outdated satellite, to increase coverage, and/or to create redundancy in the system. For example, a satellite can be added into an existing orbital plane and connected to neighboring satellites by the transceiver's steering capability. In other embodiments, the present invention discloses a system and a method for configuring or reconfiguring satellite orientation and position in a constellation to permit directional transmissions without the use of any mechanical adjusting or steering of the transceivers.

Figure 2B:
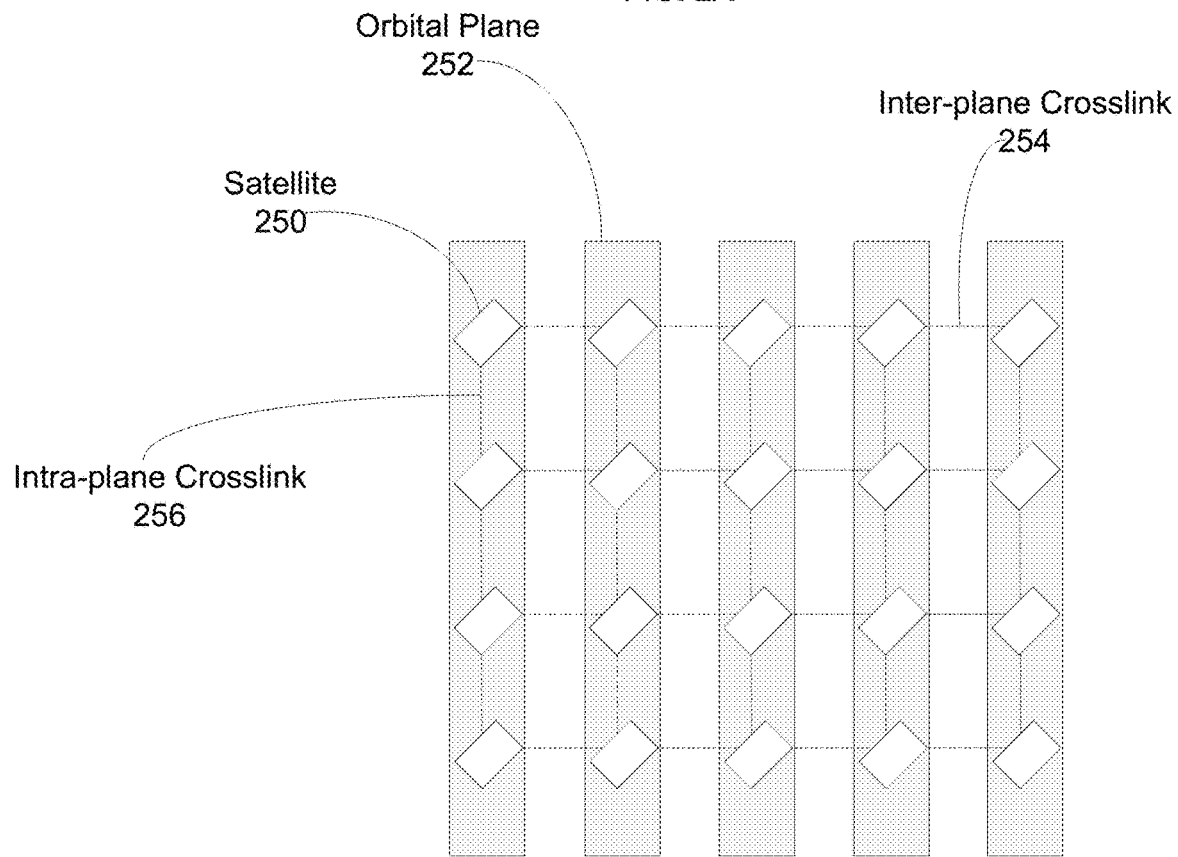
FIG. 2B illustrates a satellite network topology of communication crosslinks, according to at least one embodiment.

FIG. 2B illustrates a satellite network topology of communication crosslinks, according to at least one embodiment. A constellation of satellite 250 may be disposed in one or more orbital plane 252, communicatively coupled to neighbor satellites through inter-plane crosslink 254 and intra-plane crosslink 256. Intra-plane crosslink 256 may comprise a communication pathway between two satellites in the same orbital plane, and inter-plane crosslink 254 may comprise a communication pathway between two satellites in different, and generally juxtaposed, orbital planes. Each inter-plane crosslink 254 and intra-plane crosslink 256 may comprise one or more transceivers for optical data transmission and/or one or more antennas for RF data transmission, and may be able to reach farther than the nearest neighbor in any direction.

Although the present invention shows a 4×5 (four satellites by five planes) configuration, any other configuration may be used, such as, e.g., 24×8. In addition, satellite 250 may comprise any amount of inter-plane crosslink 254 and/or intra-plane crosslink 256, such as, e.g., more than four or less than four.

Figure 3A:
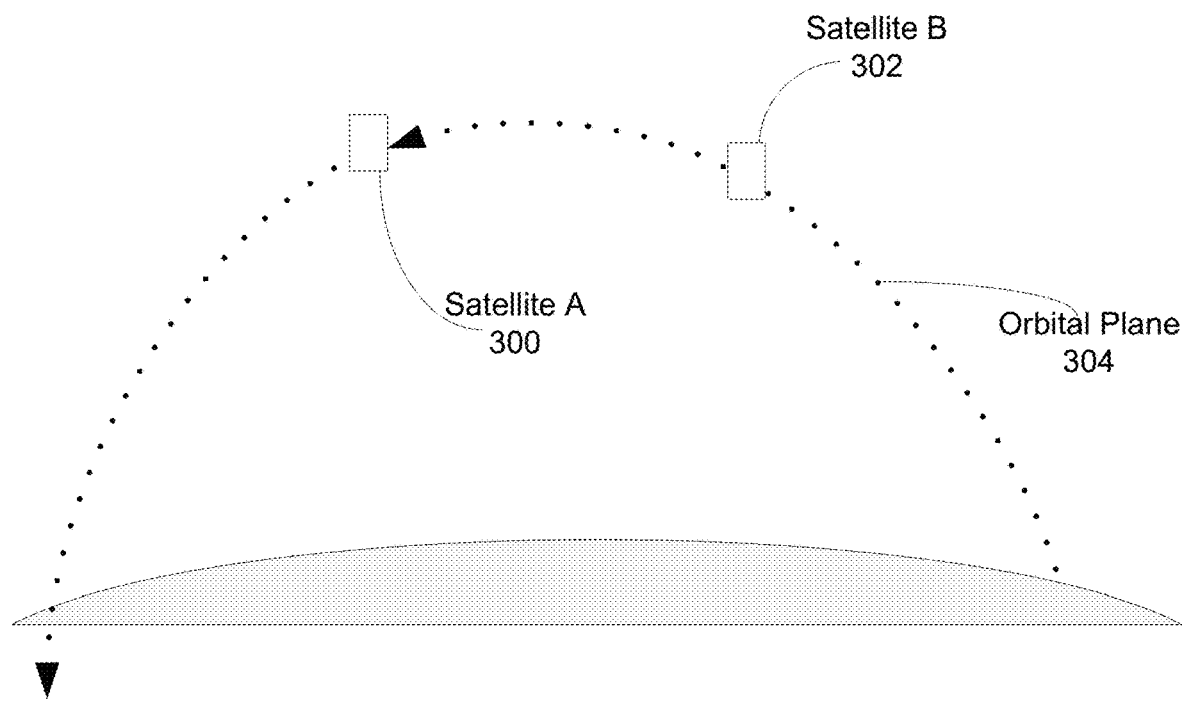
FIG. 3A illustrates a plurality of satellites orbiting a plane around the earth.

FIG. 3A illustrates a plurality of satellites orbiting a plane around the earth, according to at least one embodiment. Satellite A 300 and satellite B 302 may traverse orbital plane 304 to coordinate ground coverage and to provide a data relay between two or more terminals. They may operate under shared control and may be synchronized such that satellite A 300 may perform the relay for a particular time interval per pass of a terminal with an overlap in coverage with satellite B 302, allowing for a continuous transmission between the terminals. Satellite B 302 may trail satellite A 300 at predetermined distance, altitude, and/or time intervals, such that they are fixed in position relative and orientation to each other. In other embodiments, their relative positions are not fixed and are varying. Satellite A 300 and satellite B 302 may comprise an onboard server comprising a memory and a processor that may allow the satellites to orbit autonomously in a fixed orientation and position. In addition, it may allow satellite A 300 and satellite B 302 to change orientations and positions, such as, e.g., in order to achieve and/or to maintain a desired orientation or position.

Figure 3B:
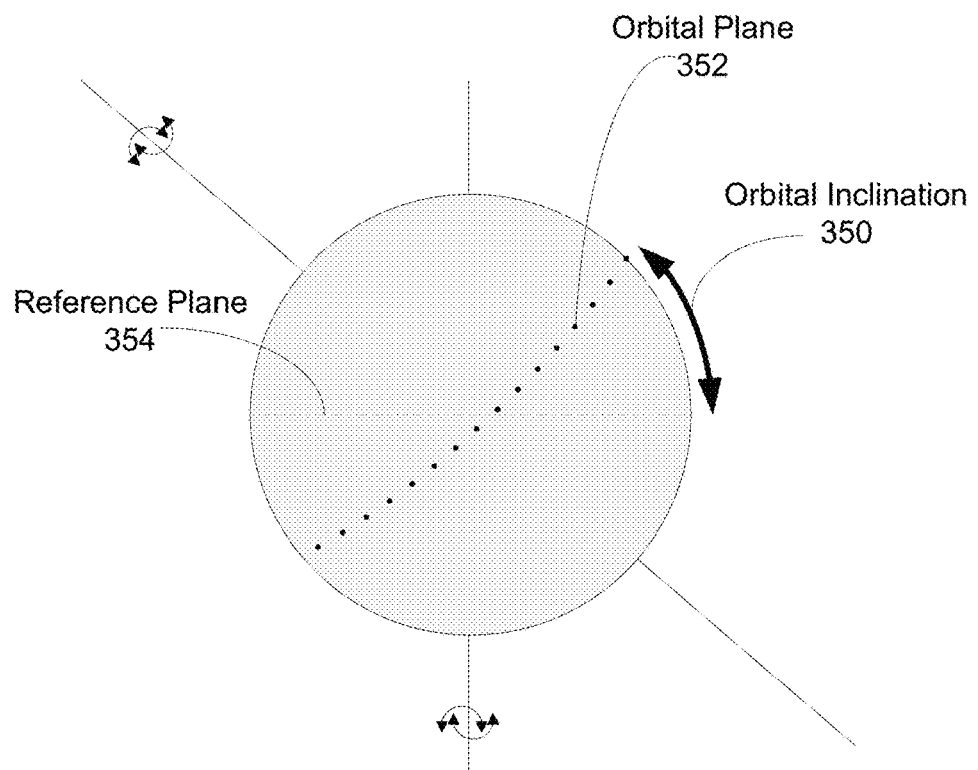
FIG. 3B shows a planet rotating about an axis and an orbital plane rotating about another axis, according to at least one embodiment.

FIG. 3B shows a planet rotating about an axis and an orbital plane rotating about another axis, according to at least one embodiment. Orbital inclination 350 may be an angle of orbital plane 352 in relation to reference plane 354 of the planet. As examples, an inclination of zero-degrees may indicate an orbital plane traveling parallel to a reference plane traveling in a generally east direction (referred to as prograde); an inclination of 90-degrees may indicate an orbital plane that is perpendicular to the reference plane and traveling in a generally north direction on one side of the earth and a generally south direction on the other side of the earth; an inclination of 180-degrees may indicate an orbital plane traveling parallel to the reference plane and in a generally west direction (referred to as retrograde); and an inclination of 270-degrees may indicate an orbital plane that is perpendicular to the reference plane and traveling in a generally south direction on one side of the earth and a generally north direction on the other side of the earth, or opposite of the direction of the 90-degree inclination. In some embodiments, reference plane 354 may be the equator of the earth.

In some embodiments, an orbital plane of a constellation of satellites may be configured to take advantage of decreasing radius of the earth at increasing latitudes in the north and south directions away from the equator, to reduce communication crosslink distances and distance variabilities, and hence to reduce data transfer latency and variability in latency. The circumference of the earth may be inversely proportional to the latitude such that a high latitude corresponds to a low radius of the circumference of the earth. For example, the constellation may be configured to provide communication coverage between two or more terminals by directing data north or south above a predetermined minimum latitude, such as, e.g., 45-degrees, to take advantage of the smaller circumference of parallels of the planet at a higher latitude.

In at least one embodiment, the present invention discloses a system and a method for determining an optimal pathway of a satellite constellation network. The system and the method may comprise dividing the communication path between two terminals into a plurality of smaller segments, which when linked together approximate the optimal pathway, for example, to minimize latency and variability in latency, and/or to increase bandwidth along the communication paths. In order to achieve minimal variability in latency, the approximation of the optimal pathway may further be required to meet or exceed a minimum accuracy threshold, in addition to optimization of variable portions of the path, such as, e.g., variations in terrestrial to non-terrestrial transmission links at each end of the communication path. The system and the method may comprise dividing the communication path between two terminals into a plurality of smaller segments, which when linked together enable maintaining of low latency between the terminals. The system may require at least one non-terrestrial satellite node; however, additional satellites may further reduce latency and variability as a plurality of segments between intermediate nodes may allow for closer approximation of the optimal pathway between the nodes in communication with the terrestrial terminals, in addition to shortening communication distances between the nodes which may permit data transfer of higher bandwidths. In other words, the accuracy and/or precision of the approximation of the optimal pathway may be directly proportional to the number of satellites in the constellation. In some embodiments, the optimal pathway may be the shortest path, such as, e.g., a path resembling a straight line between two terminals. In other embodiments, the optimal pathway may be a theoretical shortest path, such as, e.g., a mapped path that takes into consideration the geography data, shape data, and/or weather data of the earth. In essence, by using a system and a method for piece-wise approximation to path optimization through coordinating and synchronizing communications between satellite nodes, lower latency and variability in latency may be achieved.

The use of many smaller segments may enable a higher bandwidth through the pathway by allowing higher bandwidth to be maintained within each segment. Since bandwidth of a path segment operating at a constant transmitted power falls off as the path segment increases in length such that bandwidth is inversely proportional to length, by using more short segments to create a path, the bandwidth across a multiple segment path can be maintained at a higher level without the need for greater transmitted power. Furthermore, if each of these segments adds minimal latency to the overall path being traversed, then the use of more short segments to maintain high bandwidth does not significantly add to the latency or variability of latency in traversing the communications path.

After the determination of an optimal pathway, the system and the method of the present invention may comprise determining each satellite's trajectory, orientation and/or position relative to other satellites of the same constellation, such that the one or more transceivers and/or the one or more antennas of the satellites are fixed in position and do not require adjusting or steering to communicate with neighboring satellites. In some embodiments, the present invention is not so limited and adjusting or steering of the one or more transceivers and/or one or more antennas may provide proper alignment of the communication pathway. The determination of the satellite's trajectory, orientation and/or position may be based on aligning with the closest approximation of the optimal pathway between two target terminals. The satellites may then be launched into orbit and their orbital positions coordinated such that they pass in the vicinity of the closest approximation of the optimal pathway, and therefore minimizing latency and variability in latency during data transfer. In some embodiments, the satellites may be configured to provide continuous communication coverage between two or more terminals located at predetermined geographic locations relative to each orbital plane through a route that deviates from an arc between the two terminals. For example, to take advantage of the decreased circumference or radius of parallels of latitude as approaching either the South Pole or the North Pole, e.g., increasing absolute value of latitude, the satellites may only provide coverage for terminals in certain latitude regimes by routing traffic into a cross-plane communications path located at or above, e.g., 30-degrees in the north or south directions.

Figure 4A:
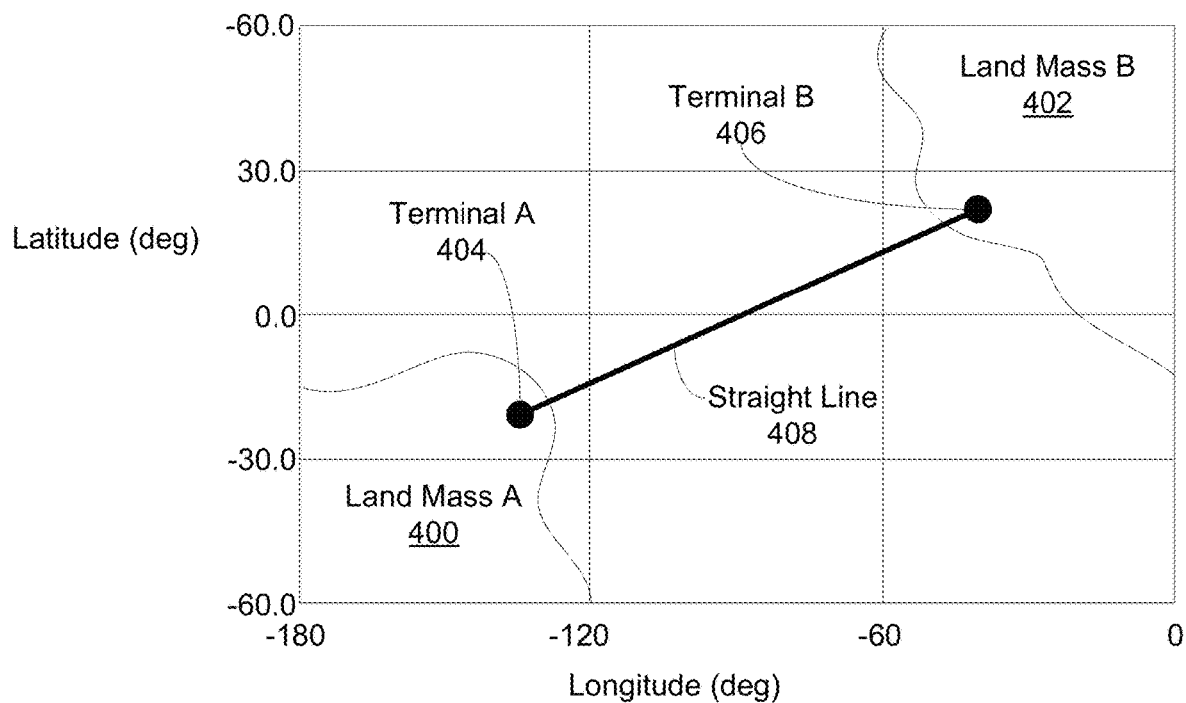
FIGS. 4A-B show a map view of optimal communication pathways to reduce latency and variability in latency overlaid with a coordinate's grid, according to at least one embodiment.
Figure 4B:
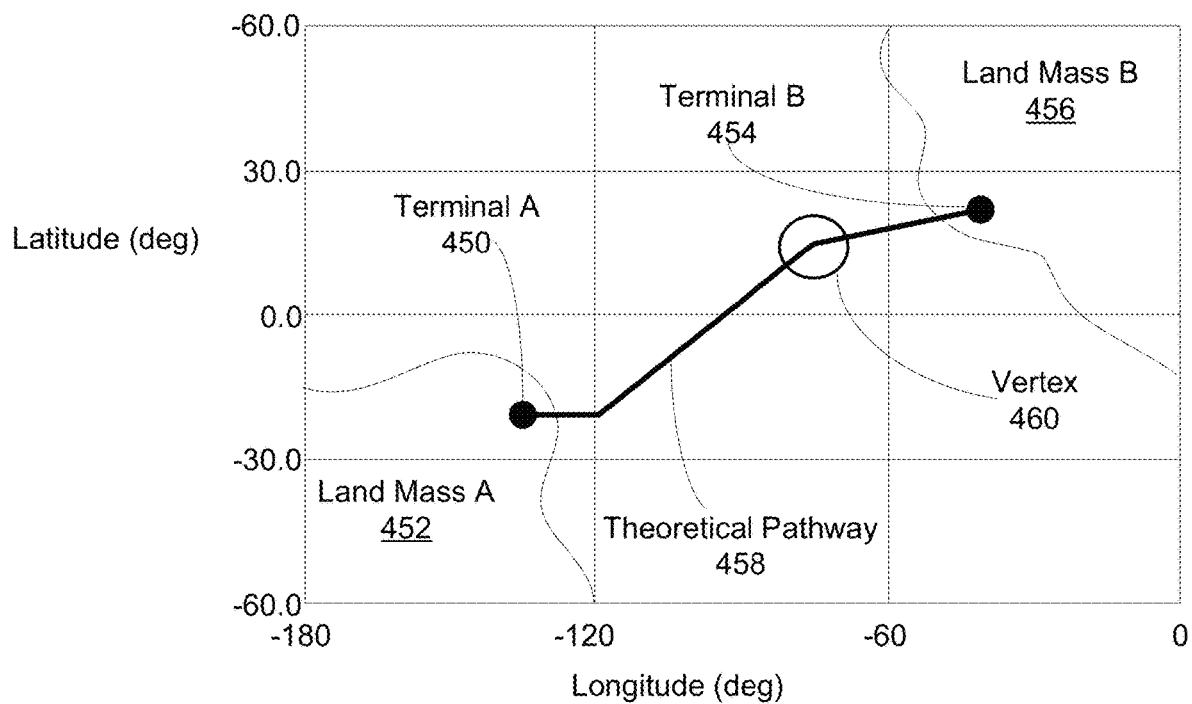

FIGS. 4A-B show a map view of optimal communication pathways to reduce latency and variability in latency overlaid with a coordinate's grid, according to at least one embodiment. In FIG. 4A, land mass A 400 and land mass B 402, comprising terminal A 404 and terminal B 406 respectively, may be separated by a geographic barrier, such as, e.g., an ocean. The optimal pathway between terminal A 404 and terminal B 406 may be straight line 408, representing an arc between the two terminals that does not intersect the surface of the earth. Straight line 408 may be a line segment with endpoints located at terminal A 404 and terminal B 406, and may be the shortest distance between the two terminals. In order to achieve the lowest latency possible, the actual communication link may mimic straight line 408. Satellites of a constellation may be coordinated to transmit data from one plane to the next, which is effectively a straight communication pathway across multiple planes. In some embodiments, mimicry of straight line 408 does not comprise terminal A 404 and terminal B 406 where data is uplinked or downlinked. In other embodiments, mimicry of straight line 408 does comprise terminal A 404 and terminal B 406.

In FIG. 4B, the optimal pathway between terminal A 450 of land mass A 452 and terminal B 454 of land mass B 456 may be theoretical pathway 458. Theoretical pathway 458 may be a charted or mapped pathway between terminal A 450 and terminal B 454 that may be the shortest path when taking into consideration the geography and topology of the earth's surface or shape. One or more theoretical pathway 458 may be determined or identified and stored in a database coupled with a memory and a processor. When two ground locations are chosen on a map, the processor may determine the shortest theoretical pathway based on recorded information within the database. In order, for example, to achieve the lowest latency possible, the actual communication link may mimic theoretical pathway 458. Theoretical pathway 458 may comprise a plurality of line segments connected at one or more vertex 460, wherein the vertex represents a change in direction or passing along of data through a satellite node.

In addition, theoretical pathway 458 may comprise one or more segments with data traveling generally in the north or south directions, e.g., the change in the north-south direction is greater than the change in the east-west direction below a predetermined latitude or minimum threshold latitude, e.g., below 30-degrees, such that the latitude changes faster than the longitude from one point to the next in traversing the pathway.

On the other hand, the two terminal segments of theoretical pathway 458 closest to terminal A 450 and terminal B 454 may generally travel in the east or west directions when at a predetermined latitude, e.g., 30-degrees or above, such that longitude changes faster than latitude from one point to the next. The one or more middle sections may be longer, separately or cumulatively, in distance than the terminal sections. This permits theoretical pathway 458 to take advantage of the fact that the circumference of the parallels of latitude may be decreasing at higher latitudes by avoiding traveling east and west at lower latitudes as much as possible.

In some embodiments, theoretical pathway 458 may not be located near a predetermined minimum latitude threshold, e.g., 30-degrees or above, and may comprise terminal segments generally traveling in the east or west direction only where the theoretical pathway 458 is highest in latitude. For example, if theoretical pathway 458 stays within 20-degrees latitude in its entirety, then an algorithm coupled with a memory and a processor may determine that sections generally traveling in the east and west directions may only begin where theoretical pathway 458 is above a predetermined minimum latitude threshold and within the upper latitude range, e.g., 15- to 20-degrees.

Figure 5A:
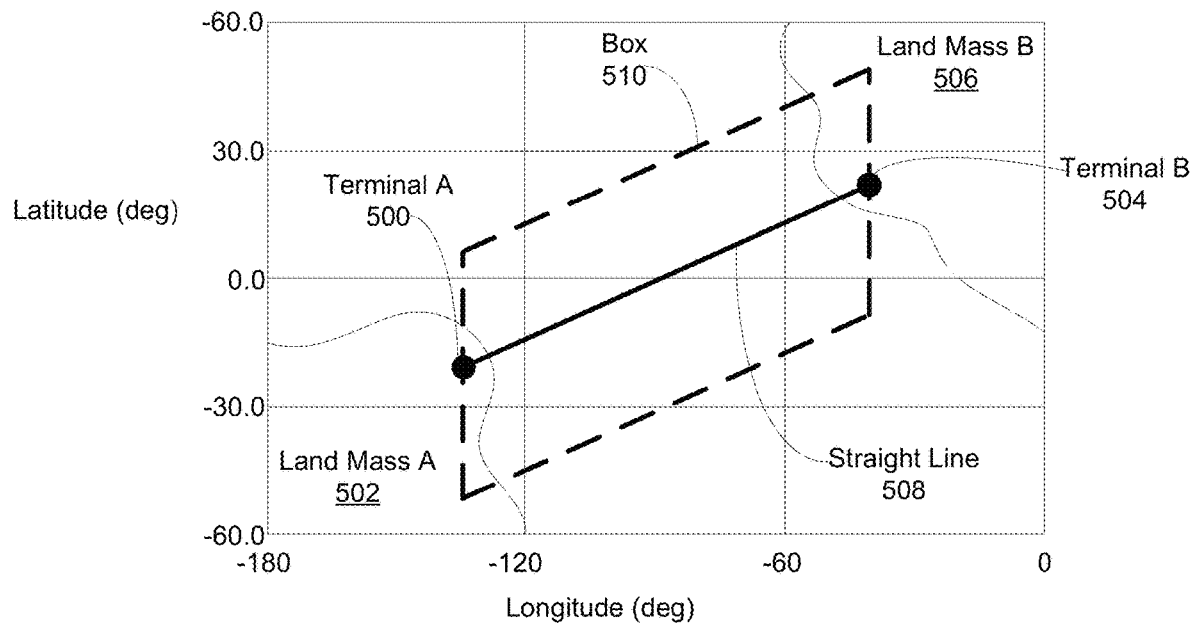
FIGS. 5A-B show a map view of optimal communication pathways to reduce latency and variability in latency overlaid with a coordinate's grid and a boundary box corresponding to the pathways, according to at least one embodiment.
Figure 5B:
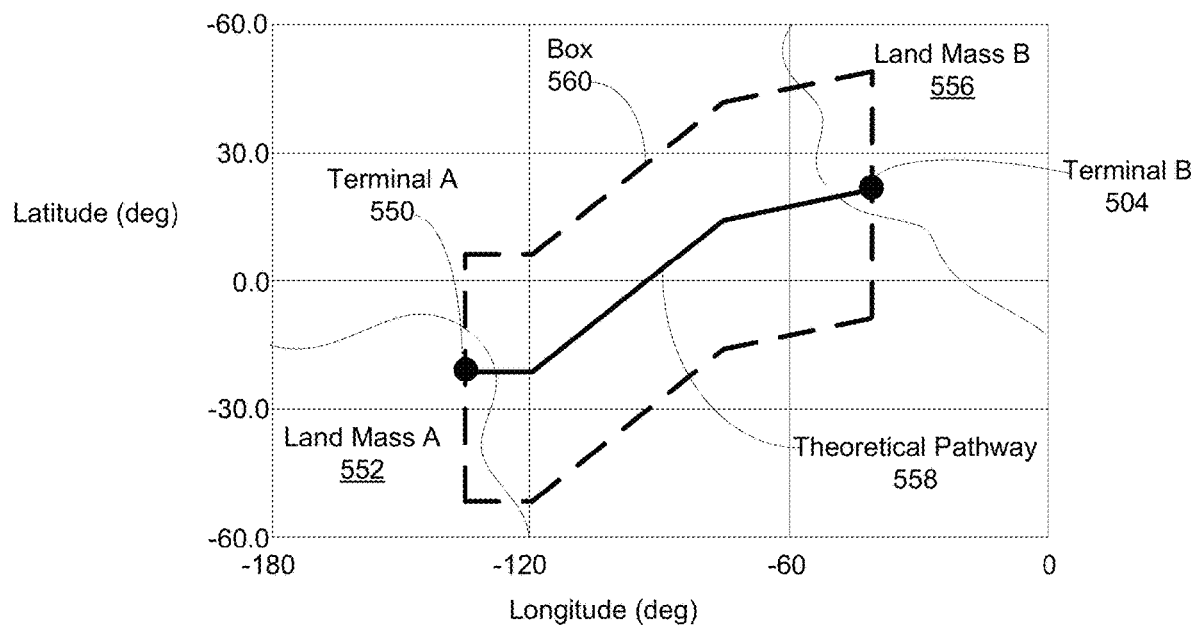

FIGS. 5A-B show a map view of optimal communication pathways to reduce latency and variability in latency overlaid with a coordinate's grid and a boundary box corresponding to the pathway, according to at least one embodiment. In FIG. 5A, the shortest path between terminal A 500 of land mass A 502 and terminal B 504 of land mass B 506 may be straight line 508. Boundary box 510 may be an algorithm-generated shape comprising maximum and minimum latitudes and longitudes within which data transfers between terminal A 500 and terminal B 504 are permitted. The area of boundary box 510 may be a cumulative of all possible integrated communication paths that approximate straight line 508 and may lie within the maximum and minimum latitudes and longitudes. The edges of box 510 may be the longest paths permitted, and may surround straight line 508, which may be the shortest path, and may be predetermined as the satellites may be configured to orbit in a predictable pattern. For example, from every point on straight line 508, there may be positive and negative maximum latitudes, e.g., 20-degrees in the north direction and 20-degrees in the south direction, and longitude, e.g., 30-degrees in the west direction and 30-degrees in the east direction, for data transfer to occur. In general, the farther away from straight line 508, the higher the latency of the communication path, such that deviation to straight line 508 within box 510 is directly proportional to latency, e.g., a larger distance will correlate with higher latency. On the other hand, the longitudinal boundaries of box 510 may be constant and equal to the longitudes of terminal A 500 and terminal B 504, since data communication may not occur beyond the positions of the terminals. In some embodiments, the longitudinal boundaries of box 510 may extend to the west or east of the terminals, since the communication segments between the last satellites in a pathway may allow communications to the terminals from locations east and or west of the terminals, not just at the same longitudes of the terminals.

As more satellites and orbital planes are added to the constellation, the latitude edges of box 510 may shrink and approach straight line 508 until it matches straight line 508. The amount of satellites in the constellation, or the amount of satellites in an effective area of a part of the constellation, may be inversely proportional to size of box 510 such that a large number of satellites may correlate with a small size, and vice versa. The effective area may be a predetermined area around the optimal pathway and may comprise a varying amount of satellites at any given time, such that the size of box 510 is dynamic and changing in real-time. An algorithm may determine the minimum amount of satellites needed to match the latitude edges of box 510 to straight line 508. When satellite and orbital plane density is increased, there would be a larger number of satellites in the constellation, and therefore, distance and time intervals of communication hand-overs between satellites of neighboring orbital planes may be decreased while hand-over frequency is increased, until a saturation point is reached and beyond, which there is a decrease in bandwidth or increase in latency of the system as more satellites are added.

In FIG. 5B, the shortest path between terminal A 550 of land mass A 552 and terminal B 554 of land mass B 556 may be theoretical pathway 558. Boundary box 560 may be an algorithm-generated shape comprising maximum and minimum latitudes and longitudes within which data transfers between terminal A 550 and terminal B 560 are permitted. The area of boundary box 560 may be a cumulative of all possible integrated communication paths that approximate theoretical pathway 558 and may lie within the maximum and minimum latitudes and longitudes. The edges of box 560 may be the longest path, and may surround theoretical pathway 558, which may be the shortest path, and may be predetermined as the satellites orbit in a predictable pattern. For example, from every point on theoretical pathway 558, there may be positive and negative maximum latitudes, e.g., 20-degrees in the north direction and 20-degrees in the south direction, and longitude, e.g., 30-degrees in the west direction and 30-degrees in the east direction, for data transfer to occur. In general, the farther away from theoretical pathway 558, the higher the latency of the communication path, such that distance to theoretical pathway 558 within box 560 is directly proportional to latency, e.g., a larger distance will correlate with higher latency. On the other hand, the longitudinal boundaries of box 560 may be constant and equal to the longitudes of terminal A 550 and terminal B 554, since data communication may not occur beyond the positions of the terminals. In some embodiments, the longitudinal boundaries of box 560 may extend to the west or east of the terminals, since the communication segments between the last satellites in a pathway may allow communications to the terminals from locations east and or west of the terminals, not just at the same longitudes of the terminals.

As more satellites and orbital planes are added to the constellation, the latitude edges of box 560 may shrink and approach theoretical pathway 558 until it matches theoretical pathway 558. The amount of satellites in the constellation, or the amount of satellites in an effective area of a part of the constellation, may be inversely proportional to size of box 560 such that a large number of satellites may correlate with a small size, and vice versa. The effective area may be a predetermined area around the optimal pathway and may comprise a varying amount of satellites at any given time, such that the size of box 560 is dynamic and changing in real-time. An algorithm may determine the minimum amount of satellites needed to match the latitude edges of box 560 to theoretical pathway 558. When satellite and orbital plane density is increased, there would be a larger number of satellites in the constellation, and therefore, distance and time intervals of communication handovers between satellites of neighboring orbital planes may be decreased while the frequency of hand-overs is increased.

Figure 6A:
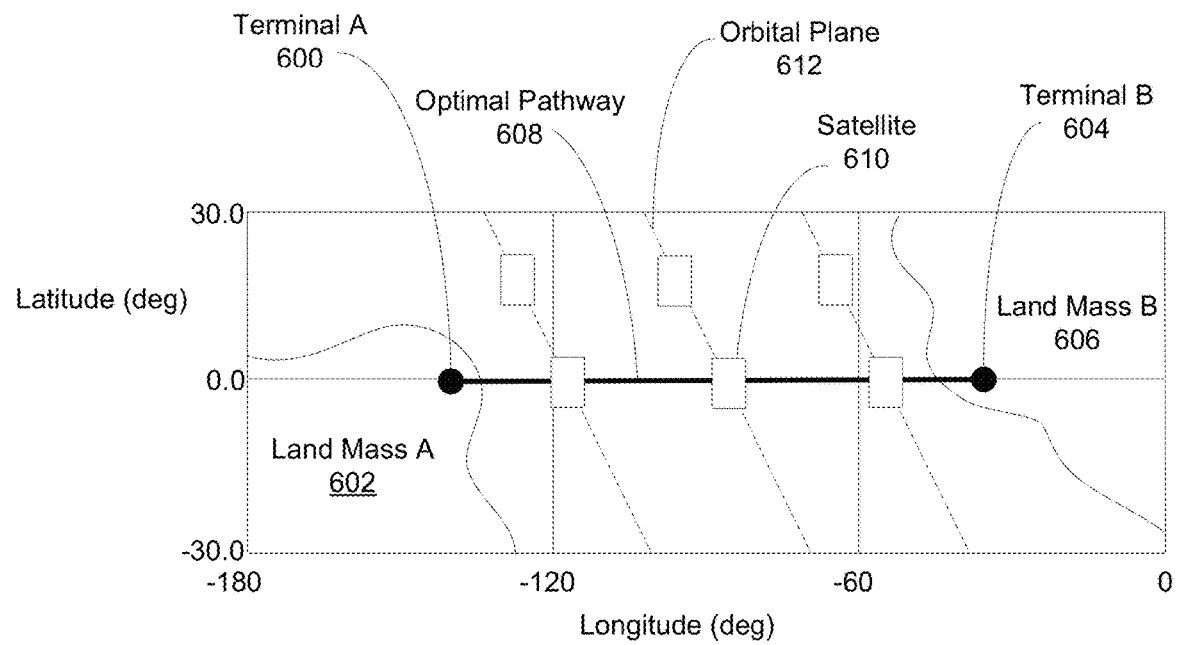
FIGS. 6A-B show a map view of a satellite constellation providing communication along optimal pathways to reduce latency and variability in latency, according to at least one embodiment.
Figure 6B:
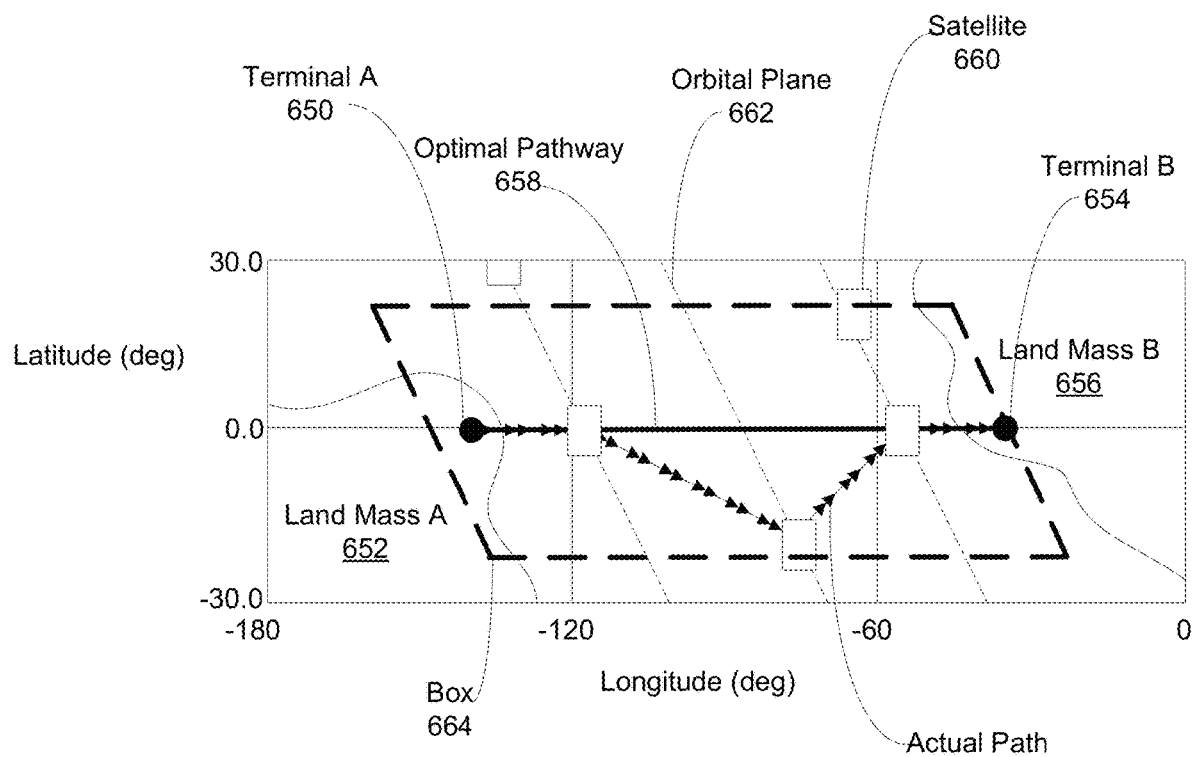

FIGS. 6A-C show map views of a satellite constellation providing communication along optimal pathways to reduce latency and variability in latency, according to at least one embodiment. In FIG. 6A, the shortest path between terminal A 600 of land mass A 602 and terminal B 604 of land mass B 606 may be optimal pathway 608. Optimal pathway 608 may be a straight line segment or a theoretical pathway comprising a plurality of line segments. A constellation of satellite 610 may be disposed in one or more evenly spaced orbital plane 612, and may be configured to provide bi-directional communication between terminal A 600 and terminal B 604 along optimal pathway 608. The constellation of satellite 610 in FIG. 6A may be fixed at predetermined distance, altitude, and/or time intervals, such that they are fixed in position relative and orientation to each other, permitting for the synchronized arrival of one or more assigned satellite 610 along optimal pathway 608 at a predetermined time. Satellite 610 may comprise an onboard server comprising a memory and a processor that may allow it to orbit autonomously in a fixed orientation and position relative to the other satellites of the constellation. In another embodiment, both the satellites 610 moving away from the optimal pathway 608 and the trailing satellite 610 may both be in the communications beam at the same time such that during their overlapping time in the beam both may continue to pass along the data without data link interruption.

Satellite 610 that is positioned closest to terminal A 600 may receive an uplink data transmission from terminal A 600, and may retransmit the data to the closest satellite 610 located at an adjacent orbital plane 612, effectively coordinating a straight inter-satellite communication path across multiple planes. Satellite 610 positioned closest to terminal B 604 may receive the data from an adjacent satellite 610 and may retransmit the data to terminal B 604 through a downlink transmission. Additionally, as each satellite 610 receives and transmits data along the data relay and then continues on its path on orbital plane 612 away from optimal pathway 608, another satellite 610 in the same orbital plane 612 may take its place to receive and transmit data along optimal pathway 608. The system may be configured such that a subsequent satellite 610 forms a new connection with another satellite 610 of a different orbital plane 612 or forms a new uplink/downlink connection with terminal A 600 or terminal B 604 before any previous connections are dropped from the preceding satellite 610 in order to maintain continuous connectivity as the constellation orbits and shifts in position relative to the earth. In other words, data may be handed over from the satellite 610 moving away from optimal pathway 608 to a trailing satellite 610 of the same orbital plane 612 through an inter-satellite crosslink in the same plane prior to disconnecting from the data relay.

In FIG. 6B, the shortest path between terminal A 650 of land mass A 652 and terminal B 654 of land mass B 656 may be optimal pathway 658. Optimal pathway 658 may be a straight line or a theoretical path comprising a plurality of line segments. A constellation of satellite 660 may be disposed in one or more evenly spaced orbital plane 662, and may be configured to provide bi-directional communication between terminal A 650 and terminal B 654 along optimal pathway 658. The constellation of satellite 660 in FIG. 6B may vary in distance, altitude, and/or time intervals, such that they are not fixed in position relative to each other, and their arrival along optimal pathway 608 varies in time.

Satellite 660 positioned closest to terminal A 650 may receive an uplink data transmission from terminal A 650, and may retransmit the data to the next closest satellite 660 located at an adjacent orbital plane 662, effectively coordinating an inter-satellite communication path across multiple planes. Satellite 660 positioned closest to terminal B 654 may receive the data from an adjacent satellite 660 and may retransmit the data to terminal B 654 through a downlink transmission. Additionally, as each satellite 660 receives and transmits data along the data relay and then continues on its path on orbital plane 662 away from optimal pathway 658, another satellite 660 in the same orbital plane 662 may take its place to receive and transmit data along optimal pathway 658. The system may be configured such that a subsequent satellite 660 forms a new connection with another satellite 660 of a different orbital plane 662 or forms a new uplink/downlink connection with terminal A 650 or terminal B 654 before any previous connections are dropped from the preceding satellite 660 in order to maintain continuous connectivity as the constellation orbits and shifts in position relative to the earth. In other words, data may be handed over from the satellite 660 moving away from optimal pathway 658 to a trailing satellite 660 of the same orbital plane 662 through an inter-satellite crosslink in the same plane prior to disconnecting from the data relay. In another embodiment, both the satellites 660 moving away from the optimal pathway 658 and the trailing satellite 660 may both be in the communications beam at the same time such that during their overlapping time in the beam both can continue to pass along the data without data link interruption.

Boundary box 664 may be an algorithm-generated shape indicating maximum and minimum latitudes and longitudes to permit data transfer between terminal A 650 and terminal B 654. The area of boundary box 664 may be a cumulative of all possible integrated communication paths that approximate optimal pathway 658 and may lie within the maximum and minimum latitudes and longitudes. The edges of box 664 may be the longest path, and may surround optimal pathway 658 which may be the shortest path, and may be predetermined by satellite orbits as the satellites move in a predictable pattern. The system may be configured to transmit data from satellite 660 to another satellite 660 of an adjacent orbital plane 662 in the direction of data flow as it moves into position when one or more transceivers and/or one or more antennas of both the transmitting satellite 660 and the receiving satellite 660 are within the edges of box 664. However, due to the constellation possibly comprising non-fixed or varied satellite movements, data transmission may occur when the satellites are within box 664 and preferably along optimal pathway 558 or a close approximation, such as depicted in FIG. 6A.

An adaptive algorithm of the system may determine the optimal pathway to transmit data to the next satellite 660 of an adjacent orbital plane 662 if there are more than one viable option based on, e.g., relative position and orientation, deviation from the optimal pathway, distance and/or electromagnetic visibility of the receiving satellite 660 and the transmitting satellite 660, and saturation or congestion of the communication path. For example, there may be a maximum threshold distance between a pair of satellite 660, at which point beyond transmission may not be possible. In addition, electromagnetic visibility may depend on electromagnetic interference, atmospheric content or debris and the presence of clouds or adverse weather conditions for platforms resident in the atmosphere or space and may depend on electromagnetic interference or other space effects for platforms in space. Relative positions and orientations of the communicating satellites may ideally be in a state to properly transmit and receive a signal. As such, only the satellites in orbital locations that most approximates optimal pathway 658 are used when predetermined constraints and parameters are met. In addition or alternatively, each surrounding receiving satellite 660 may comprise a value coinciding with whether to establish connection with the transmitting satellite 660, and which may be based on, e.g., relative position and orientation, deviation from the optimal pathway, distance, electromagnetic visibility, and/or saturation or congestion of the communication path. Deviation from the optimal pathway may in part be determined by distance between the pair of satellite 660.

Actual path 666 may be the communication pathway that is taken by the system and the method, and may have been determined by the optimization algorithm. Actual path 666 may be the most accurate approximation of optimal pathway 658 by the satellites at any given time. In some embodiments, it may be preferred actual path 666 comprise the maximum number of satellites possible, such as a saturation point prior to a decrease in bandwidth or increase in latency from the possible complexity in the system, e.g., to meet or exceed a predetermined minimum communication distance threshold, in order to take advantage of the piece-wise network configuration, while minimally deviating from optimal pathway 658.

As more satellites and orbital planes are added to the constellation, the edges of box 664 may shrink and approach optimal pathway 658 until it matches optimal pathway 658. The amount of satellites in the constellation, or the amount of satellites in an effective area of a part of the constellation, may be inversely proportional to size of box 664 such that a large number of satellites may correlate with a small size, and vice versa. The effective area may be a predetermined area around the optimal pathway and may comprise a varying amount of satellites at any given time, such that the size of box 664 is dynamic and changing in real-time. An algorithm may determine the minimum amount of satellites needed to match the latitude edges of box 664 to optimal pathway 658. When satellite and orbital plane density is increased, there would be a larger number of satellites in the constellation, and therefore, distance and time intervals of communication hand-overs between satellites of neighboring orbital planes may be decreased while the frequency of hand-overs is increased.

In at least one embodiment, data may be sent along multiple paths that approximate optimal pathway 608 so that handovers between the satellites in the same plane are not necessary. In such situation, overlapping data or duplicate data reaching the destination terminal is processed out of the data stream by the receiving satellite or terminal so that latency is not increased in the space portion of the pathway. The types of constellations that can be implemented is not limited to the present exemplary embodiment, but can be extended to other types. For example, spacing of orbital planes may in some constellations be evenly spaced, while other constellations may not be evenly spaced. And in some constellations the inclination of the planes may all be the same, while in other constellations the inclinations of the planes may be varying.

Figure 7A:
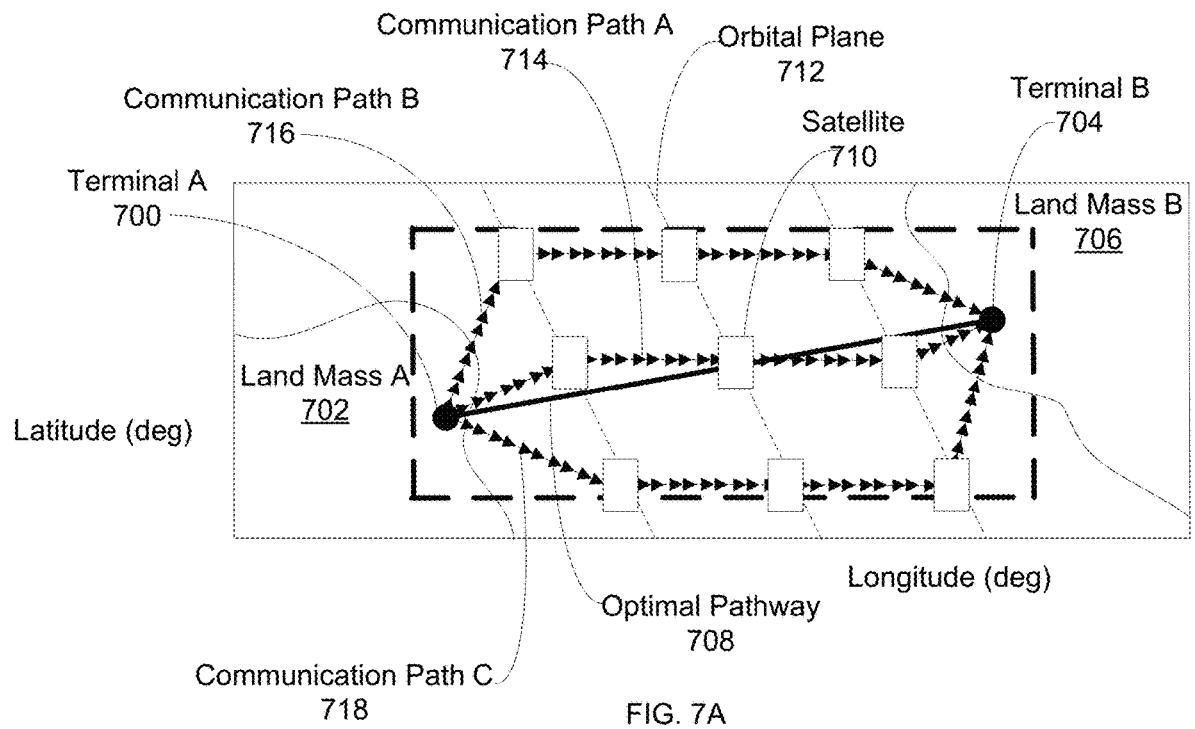
FIGS. 7A-B show map views of a satellite constellation and multiple data paths overlapping along an approximation of an optimal pathway, according to some embodiments.
Figure 7B:
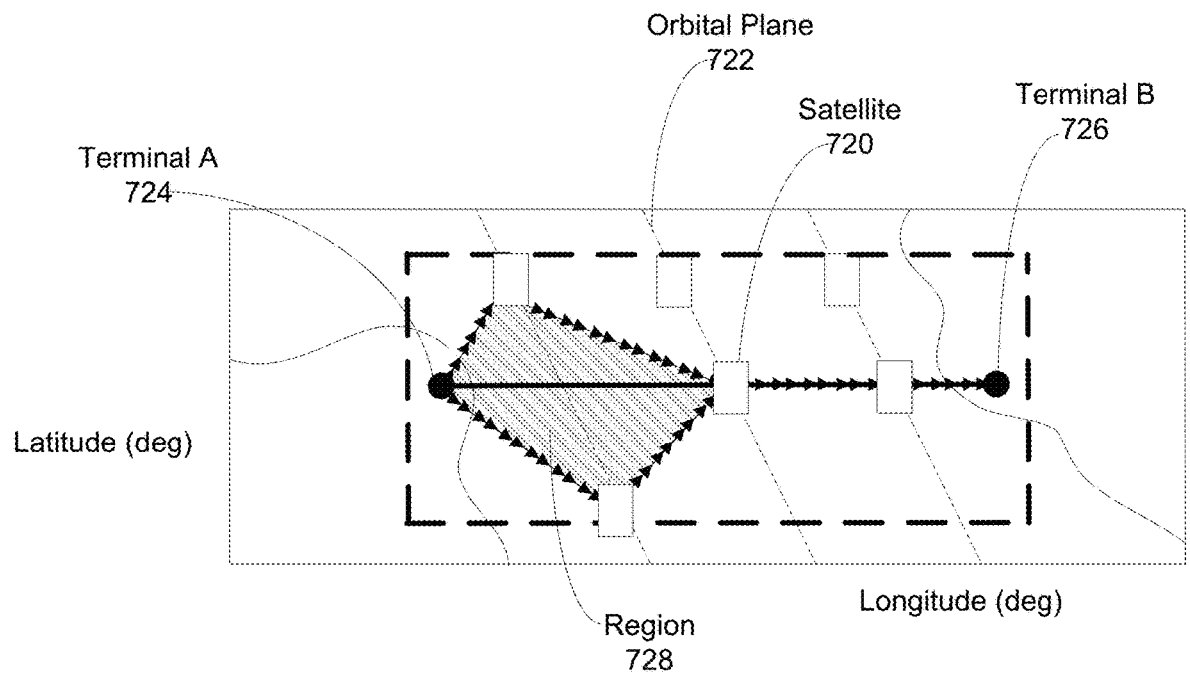

FIGS. 7A-B show map views of a satellite constellation and multiple data paths overlapping along an approximation of an optimal pathway, according to some embodiments. In FIG. 7A, a satellite constellation may provide communication overlap along an approximation of an optimal pathway, according to at least one embodiment. The shortest path between terminal A 700 of land mass A 702 and terminal B 704 of land mass B 706 may be optimal pathway 708. Optimal pathway 708 may be a straight line or a theoretical path comprising a plurality of line segments. A constellation of satellite 710 may be disposed in one or more evenly spaced orbital plane 712, and may be configured to provide bi-directional communication between terminal A 700 and terminal B 704 along the best approximation to optimal pathway 708 represented by communication path A 714. Coverage overlap is provided by alternate paths such as would exist when the data being communicated is sent along one or more additional communication paths sharing some or none of satellite 710 along each path between terminal A 700 and terminal B 704. By providing two or more redundant pathways—communication path B 716 and communication path C 718—with identical content, such overlap may protect from noise, provide confirmation of data, provide an analytical approach to increasing data throughput from terminal A 700 to terminal B 704, and avoid gaps in transmission. Coverage overlap may be provided by two or more transmission beams along the same communication path that are identical in content but different in frequency or polarization, or are encoded differently so that they are affected differently by passage through the region of space.

FIG. 7B shows a partial communication overlap with a transmission signal being sent along two different paths through satellite nodes in the same orbital plane at the start of a transmission. That is, data transmission between terminal A 724 and terminal B 726 may travel along an approximation of an optimal pathway, and overlap along only a portion of the distance between terminal A 724 and terminal B 726. The portion of the distance may be a beginning portion, a middle portion, and/or an end portion of the transmission. Terminal A 724 may transmit data to multiple satellite nodes of an orbital plane 722 as each node engages and disengages based on electromagnetic visibility to terminal A 724. Generally, a leading node that becomes visible to terminal A 724 may be the first to initiate transmission or reception of data with terminal A 724 prior to a trailing node becoming visible to terminal A 724 at a later time. The satellite constellation, and particularly the nodes of an orbital plane, may be configured such that two nodes can receive transmission from terminal A 724 for a portion of the time the satellites are both electromagnetically in view. During the time when two nodes are in view, duplicate data to or from terminal A 724 may travel along two paths simultaneously to reach the two (or more) respective nodes in view.

In the next series of data transmissions, the two initial nodes may sequentially transmit data along a northern path and a southern path that may converge towards the optimal pathway to a single node (as shown), wherein the two data transmissions may comprise an overlap region 728. Overlap region 728 may be a region that covers both signal paths until they meet at the single node, and may encompass the content as duplicate data. By providing redundancy in the data transmission channel, overlap may protect from noise, provide confirmation of data, provide an analytical approach to increasing data throughput from terminal A 724 to terminal B 726, and avoid gaps in transmission.

In some embodiments, terminals of communication pathways may not be restricted to fixed terrestrial facilities, and may also be mobile, such as, e.g., a ground vehicle; airborne, such as, e.g., a manned or an unmanned aerial vehicle or a hot-air balloon; maritime, such as, e.g., an ocean vehicle or platform; and/or space-based, such as, e.g., another satellite. In one example, a ground user may wish to communicate to a GEO asset (geosynchronous platform) that he may not be located beneath. In this case, we have again two communications channel endpoints that are geographically constrained—the user to his ground location, and the geosynchronous satellite to the orbital location that gives it an earth footprint that is different and distinct, e.g., at some distance, from what the ground user can see. For instance, say it is a GEO asset on the other side of the planet, or for a polar user (north or south poles), a GEO asset overlooking a more southerly or northerly latitude respectively than he can see, e.g., the equator. In any such case, the network path would be defined by a bounding box constrained at one end by the user's geographic location, and at the other end by the GEO assets ground footprint (also a geographically defined reference). In this case, the communication would be from ground to space when a constellation satellite reaches the user, e.g., enters the bounding box where they can communicate with the user, and the communication at the other end of the bounding box would be up to a higher location in space, e.g., to the GEO asset, when a constellation satellite enters that part of the bounding box.

In another example, two geosynchronous assets may not comprise communication crosslinks, and their only path to the ground is typically through terrestrial ground stations. If one of those stations were for some reason not able to communicate, information could not be passed from one geosynchronous satellite to the other using terrestrial networks to span the distance between their different ground-based foot prints. This may be resolved by instead communicating to a separate network constellation from one of the two geosynchronous satellites, wherein the separate network constellation may communicate with the other of the two geosynchronous satellites. The communications to the separate network by the two geosynchronous satellites would be defined within a bounding box defined by each GEO satellite's footprint, again a feature that is geographically defined, but communications would not be to the ground in either case, but only between space objects.

Figure 8A:
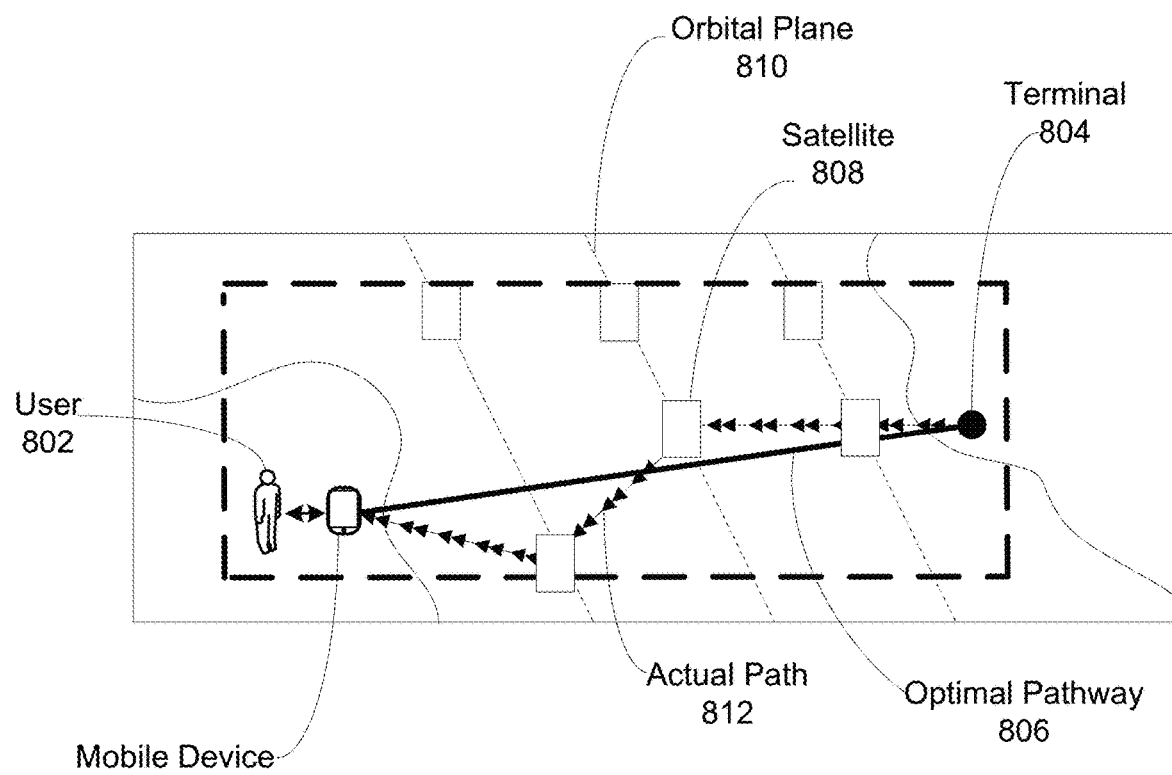
FIGS. 8A-B show a map view of a satellite constellation providing communication along optimal pathways comprising various terminal types, according to at least one embodiment.
Figure 8B:
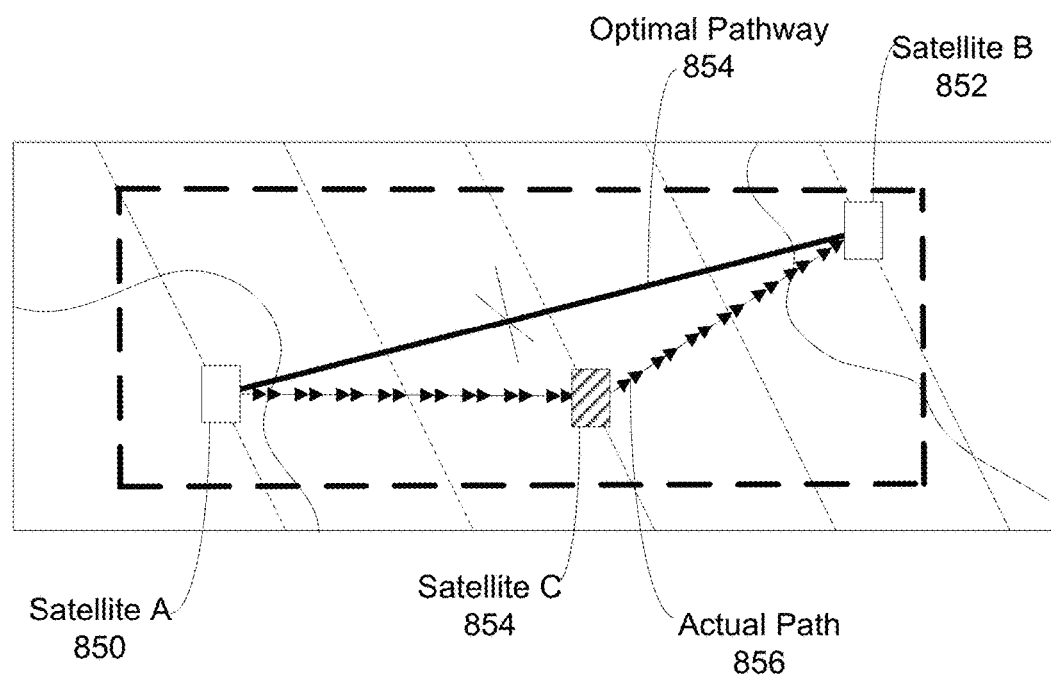

FIGS. 8A-B show a map view of a satellite constellation providing communication along optimal pathways comprising various terminal types, according to at least one embodiment. In FIG. 8A, the shortest path between mobile device 800 of user 802 and terminal 804 may be optimal pathway 806. Optimal pathway 806 may be a straight line or a theoretical path comprising a plurality of line segments. A constellation of satellite 808 may be disposed in one or more evenly spaced orbital plane 810, and may be configured to provide bi-directional communication between mobile device 800 and terminal 804 along optimal pathway 806. Actual path 812 may be the path taken by the system and the method, and may be the most accurate approximation of optimal pathway 806 at any given time that is based on satellite availability. In some embodiments, it may be preferred actual path 812 comprise the maximum number of satellites possible in order to take advantage of the piecewise network configuration, while minimally deviating from optimal pathway 806.

In FIG. 8B, the shortest path between satellite A 850 satellite B 852 may be optimal pathway 854. Optimal pathway 854 may be a straight line or a theoretical path comprising a plurality of line segments. However, satellite A 850 and satellite B 852 may not comprise a transmission crosslink for uni- or bi-directional communication. Satellite C 854 of a separate network constellation may be able to link satellite A 850 and satellite B 852 through actual path 856. The present example embodiment may not comprise any ground or terrestrial platforms.

Figure 9:
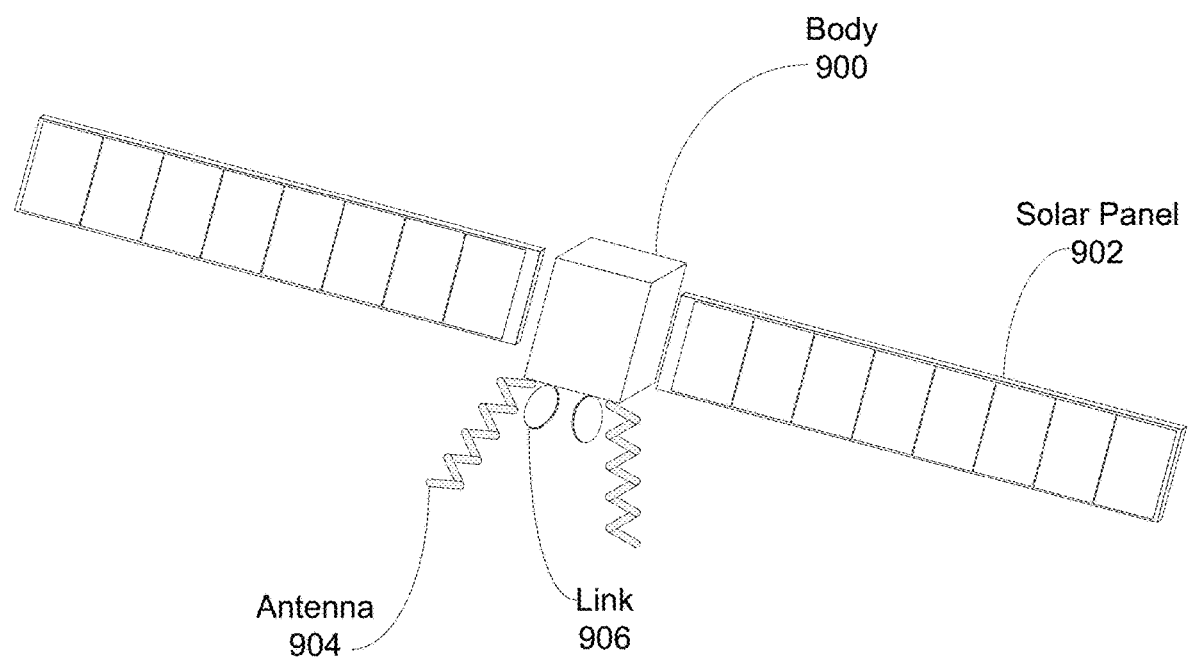
FIG. 9 is a schematic diagram of a satellite that may be implemented in at least one embodiment of the present invention.

FIG. 9 is a schematic diagram of a satellite that may be implemented in at least one embodiment of the present invention. The satellite may be a member of a constellation of other satellites that may be configured to provide continuous coverage to a predetermined area between two or more terminals, and may comprise a central body 900. Body 900 may house a service module and/or a communications payload. The communications payload may comprise a space to ground communications antenna 904 and inter-satellite link 906. One or more antenna 904 may comprise any shape, such as, e.g., a helical shape, and may be maintained to point at a terminal on the earth's surface for RF data transmission. In some embodiments, the satellite may be configured to communicate with the terminal by optical data transmission using the satellite's one or more transceivers. The terminal may comprise a plurality of up/down-link telescopes and/or antennas such that new connections can be established before the old one is broken, as the satellite constellation passes the ground site.

The service module may comprise a structural subsystem configured to provide a mechanical base structure and to shield internal circuitry from extreme temperature changes, the ambient environment, radiation effect and/or micrometeorite damage; a telemetry subsystem configured to monitor onboard equipment operations, transmits equipment operation data to the earth control station, and/or receive the control station's commands to perform equipment operation adjustments; a power subsystem comprising one or more batteries coupled to solar panel 902 configured to supply power to other satellite subsystems; a thermal control subsystem configured to protect electronic equipment from extreme temperatures due to internally produced heat, external solar heat, and the freezing temperatures due to lack of sunlight exposure on different sides of central body 900; and an attitude and orbit control subsystem comprising attitude and orbit control sensors and actuators, e.g., propulsion mechanisms such as small rocket thrusters, configured to maintain the satellite in a predetermined orbital orientation and position, in addition to maintaining direction of the one or more antenna 904.

Figure 10:
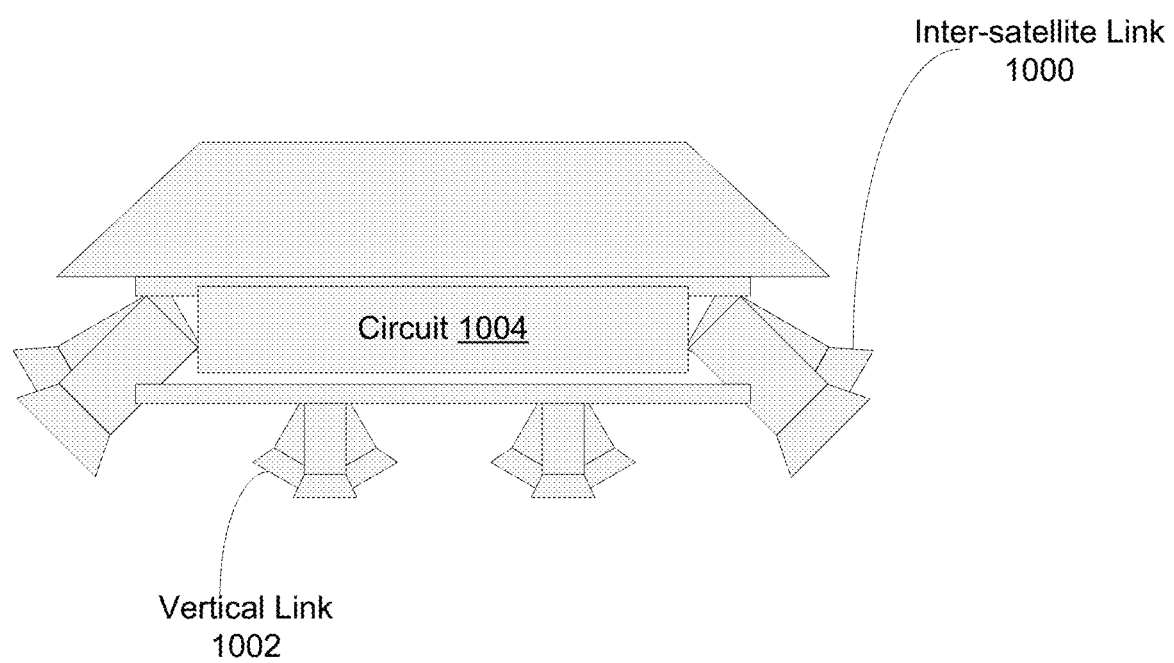
FIG. 10 illustrates a communication payload that may be implemented in at least one embodiment of the present invention.

FIG. 10 illustrates a communication payload that may be implemented in at least one embodiment of the present invention. The payload may comprise inter-satellite link 1000 disposed at an exterior portion of a satellite for inter-satellite intra- and inter-plane communications. Inter-satellite link 1000 may comprise one or more transceivers for optical data transmission and reception, and/or one or more antennas for RF data transmission and reception. The transceivers and/or antennas may be configured to be adjustable or steerable, such as, e.g., for calibration with neighboring satellites or for establishing new communication paths such as when a new satellite is launched into orbit. In some embodiments, one or two nearest neighboring satellites may be utilized for inter-satellite intra- and inter-plane communications. Beam steering may be used to compensate for satellite jitter and slight orbit variations. Vertical link 1002 may be configured to communicate with a terminal through an uplink and/or a downlink connection, and may also be adjustable and/or steerable, such as, e.g., comprising a gimbal or electronically steered phased array to track a terminal. Vertical link 1002 may also comprise one or more transceivers for optical data transmission and reception, and/or one or more antennas for RF data transmission and reception, and may be disposed on the exterior of the satellite. Circuit 1004 may comprise a processor and memory configured for receiving, transmitting, filtering, processing, amplifying and/or switching data signals. In some embodiments, circuit 1004 may be configured to only receive and transmit data signals, but to not filter, process, amplify or switch data signals. In other embodiments, inter-satellite link 1000 and vertical link 1002 may not be adjustable or steerable, such that they are fixed in position.

Figure 11:
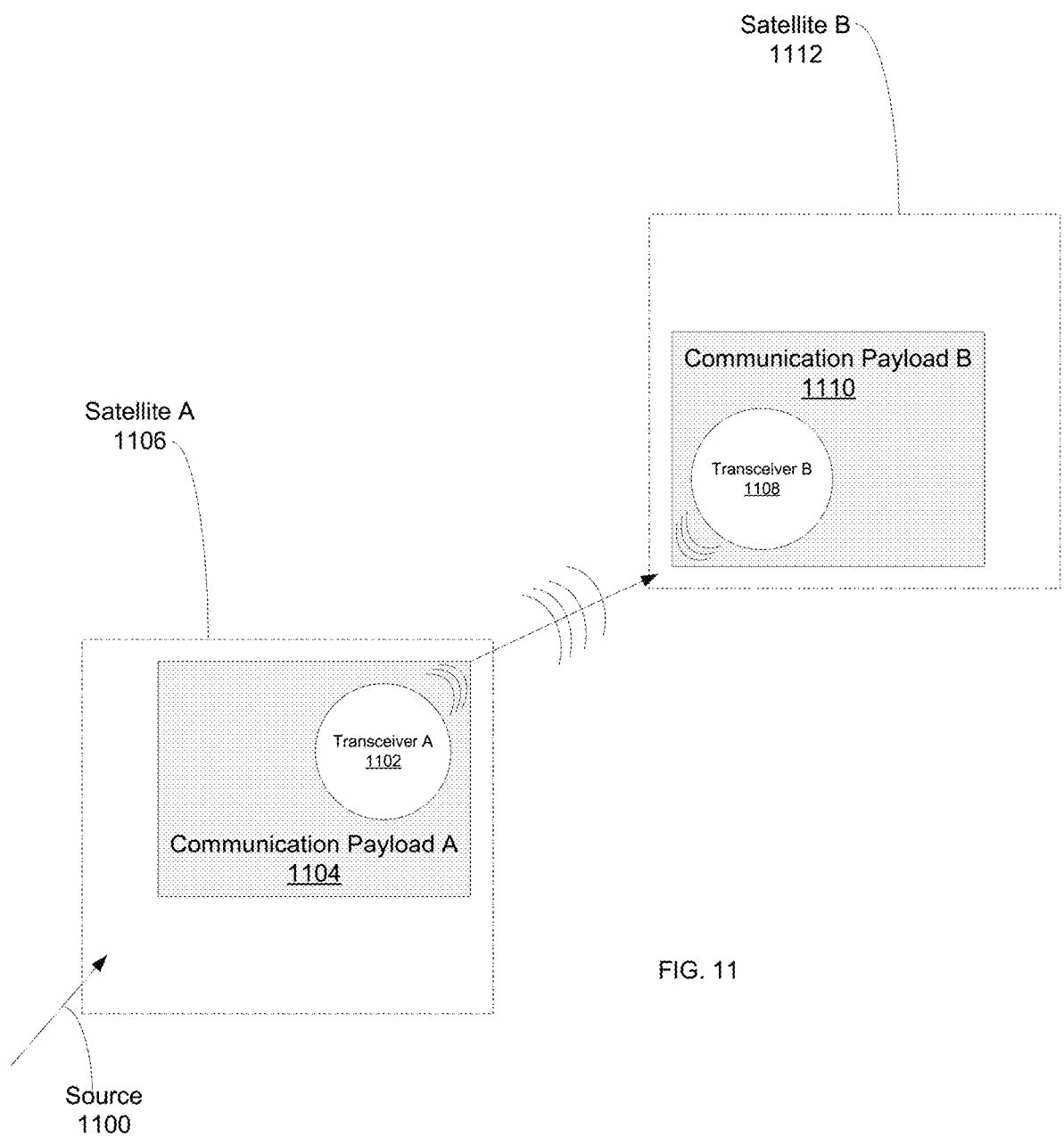
FIG. 11 is a diagram of a communications channel, according to at least one embodiment.

FIG. 11 is a diagram of a communications channel, according to at least one embodiment. Source 1100 may be a terminal, such as, e.g., a ground station, an airborne vessel, a maritime vessel, or a mobile device, and may transmit data to transceiver A 1102 of communication payload A 1104 of satellite A 1106. The data may comprise a plurality of signals assigned to specific frequencies within a designated frequency band and multiplexed into a wavelength division multiplex signal. The wavelength division multiplex signal may substantially increase transmission rate by using a plurality of channels, each transporting a part of the information to be transmitted. The signal may not require to be converted to electrical signals such that it is simply traveling through a direct pipeline and changes its direction towards a destination. Transceiver A 1102 may retransmit the signal to transceiver B 1108 of communication payload B 1110 of satellite B 1112 without performing any type of analyzation or processing of the data.

Figure 12:
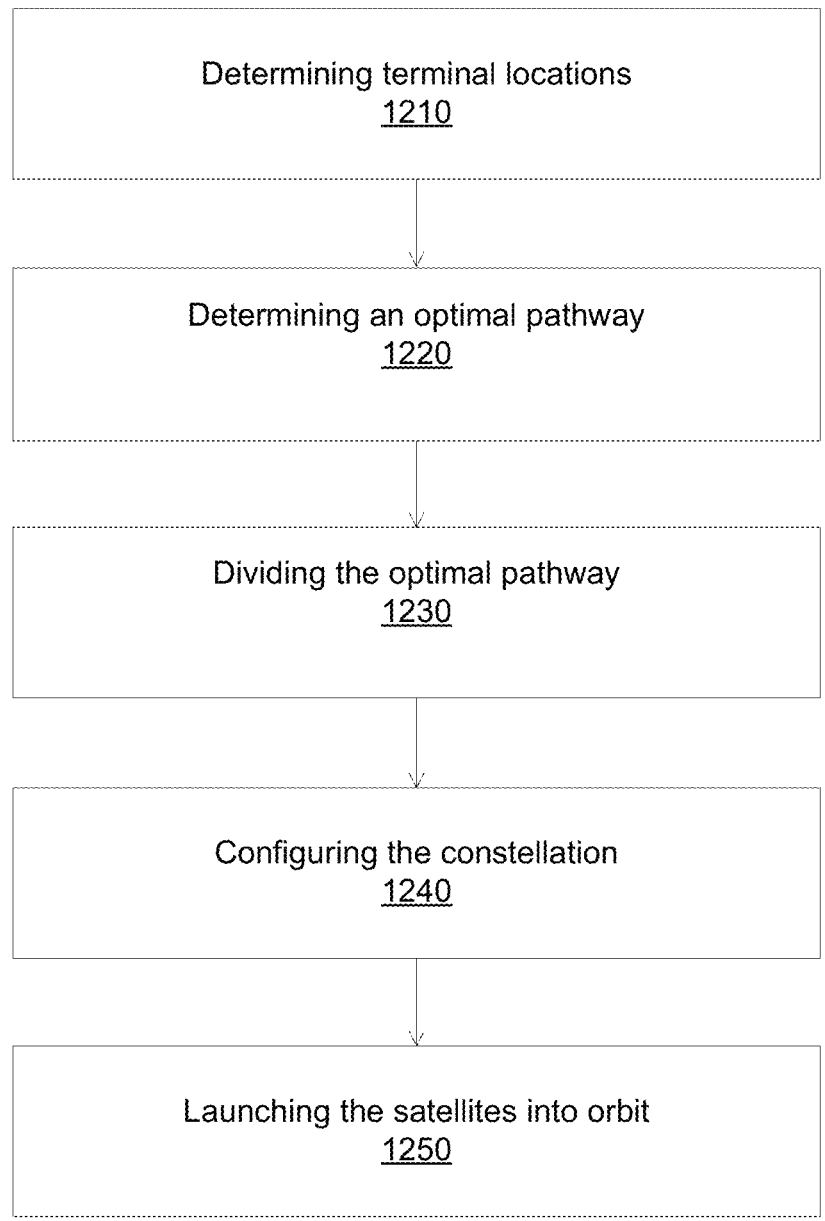
FIG. 12 is a flowchart of a method for a communication network comprising one or more satellites, according to at least one embodiment.

FIG. 12 is a flowchart of a method for a communication network comprising one or more satellites. Operation 1210 determines starting and ending terminal locations for transferring data from and to. The terminals may be positioned at a predetermined minimum latitude in order to take advantage of the decreasing circumference of the earth at increasing latitudes. Terminals may be fixed terrestrial facilities such as a ground terminal, and may also be mobile, such as, e.g., a ground vehicle; airborne, such as, e.g., a manned or an unmanned aerial vehicle or a hot-air balloon; maritime, such as, e.g., an ocean vehicle or platform; and/or space-based, such as, e.g., another satellite. Operation 1220 determines an optimal pathway based on, e.g., relative position and orientation, distance and/or electromagnetic visibility of the receiving satellite and the transmitting, and saturation or congestion of the pathway. The optimal pathway may be a straight line or a theoretical pathway between the terminals. Operation 1230 divides the optimal pathway into a plurality of smaller segments, which when linked together approximates the optimal pathway for low latency data transfer between the terminals. Operation 1240 configures the constellation in position, orientation, and trajectory to approximate the smaller segments and to permit directional transmissions without the use of any mechanical adjusting or steering of the transceivers. In some embodiments, the present invention is not so limited and adjusting or steering of the one or more transceivers and/or one or more antennas may provide proper alignment of the communication pathway. The determination of the satellite's trajectory, orientation and/or position may be based on aligning with the closest approximation of the optimal pathway between the terminals. Operation 1250 launches the satellites into orbit and their orbital positions coordinated such that they pass in the vicinity of the closest approximation of the optimal pathway, and therefore minimizing latency and variability in latency during data transfer. After data has reached an endpoint at either terminal, it may then be delivered to an end user location, such as, e.g., a financial services server or a terrestrial communication network.

In some embodiments, the communication relay system may be configured to be scalable and/or reconfigurable, such that individual satellites of a constellation in orbit can be added, removed, re-oriented and/or re-positioned while maintaining continuous connectivity between the terminals. The system may also be configured to comprise extra or redundant satellite nodes or communication paths, such as used to make new connections before old ones are dropped in order to maintain continuous connectivity as the satellites orbit around the earth. For example, a satellite can be added into an existing orbital plane and connected to neighboring satellites by the transceiver's steering capability.

In at least one embodiment, the present invention discloses a system and a method for establishing a communications pathway along a multi-link free-space path comprising continuously moving nodes that may be based solely on geographic location information of the source and destination points, instead of information about nodes outside of the geographic region of the free-space path, content or metadata, such as, e.g., date, time, headers of the information content, destination address information, and other information that may permit the destination to be searched, or which may require analysis or interpretation of the information content. The pathway may be predetermined in position and orientation, and therefore, the nodes may be active based on geo location data, e.g., GPS, as opposed to legacy systems that inspect the data and in real-time determine the optimum path to send the data to the ending destination. In one embodiment, the communication pathway may mimic a fiber cable wherein data may enter one end of this data channel exit the other end of the data channel without any hindrances. Because of the predefined data channel in our implementation and the predictability of the orbit hand-offs, data transfer predictions can be used to minimize the variability in the latency without any knowledge of the data content.

All prior attempts at laser communication in space have used an optical-to-electrical-to-optical (O-E-O) approach, with the incoming optical signal converted to an electrical signal, and then converted back to an outgoing optical signal. This may have the advantages that the signal can undergo a full re-amplification, re-shaping and re-timing (3R) regeneration on-board while it is in the electrical domain, but the size, weight, and particularly power of the hardware may be a severe challenge. In addition, due to the additional processing steps requires, additional latency may be introduced to the system. Much of the work has also concentrated on using satellites in GEO, for which the range is much farther than the MEO and LEO satellites.

The system and the method of the present invention may optically forward data onto the next satellite in an adjacent orbital plane in the communication pathway until it reaches the last satellite, which may be closest to the destination terminal, without converting the optical signals into electrical signals, and thus, without analyzing information about satellites outside of the free-space path or regard to determining communication content. In other words, data entering a geographically defined region in space at one satellite is simply retransmitted to the next satellite with only possibly signal conditioning which avoids introduction of latency or signal propagation delays from analysis of signal content, or transduction of the communications signal from one electromagnetic form into another electromagnetic form that introduces latency or signal propagation delays as the data is passed on to the next node in the geographically defined region in space, e.g., within the communication path or channel. This approach is used to reduce or eliminate delays introduced into a communications chain due to traditional processing of data to establish a routing path, such as, e.g., analyzing, interpreting, compressing, and encrypting or decrypting elements of the communications data to determine how to forward the data along the chain of moving nodes based on content in the data, e.g., destination address information or such as analyzing relative positions and orientations of satellites to determine if path changes are required based on changes in relative position and orientation. The data sequence may be amplified or the signal electrically conditioned, such as, e.g. filtered to remove noise, but it is not processed in any fashion that evaluates or uses content to make decisions. In addition, downlinking of the data being communicated to the destination terminal from the last satellite may also be performed independent of communication content or traffic information, and may be based on the geographic location relative to the destination terminal and/or electromagnetic visibility of communication devices that are at the destination.

Figure 13A:
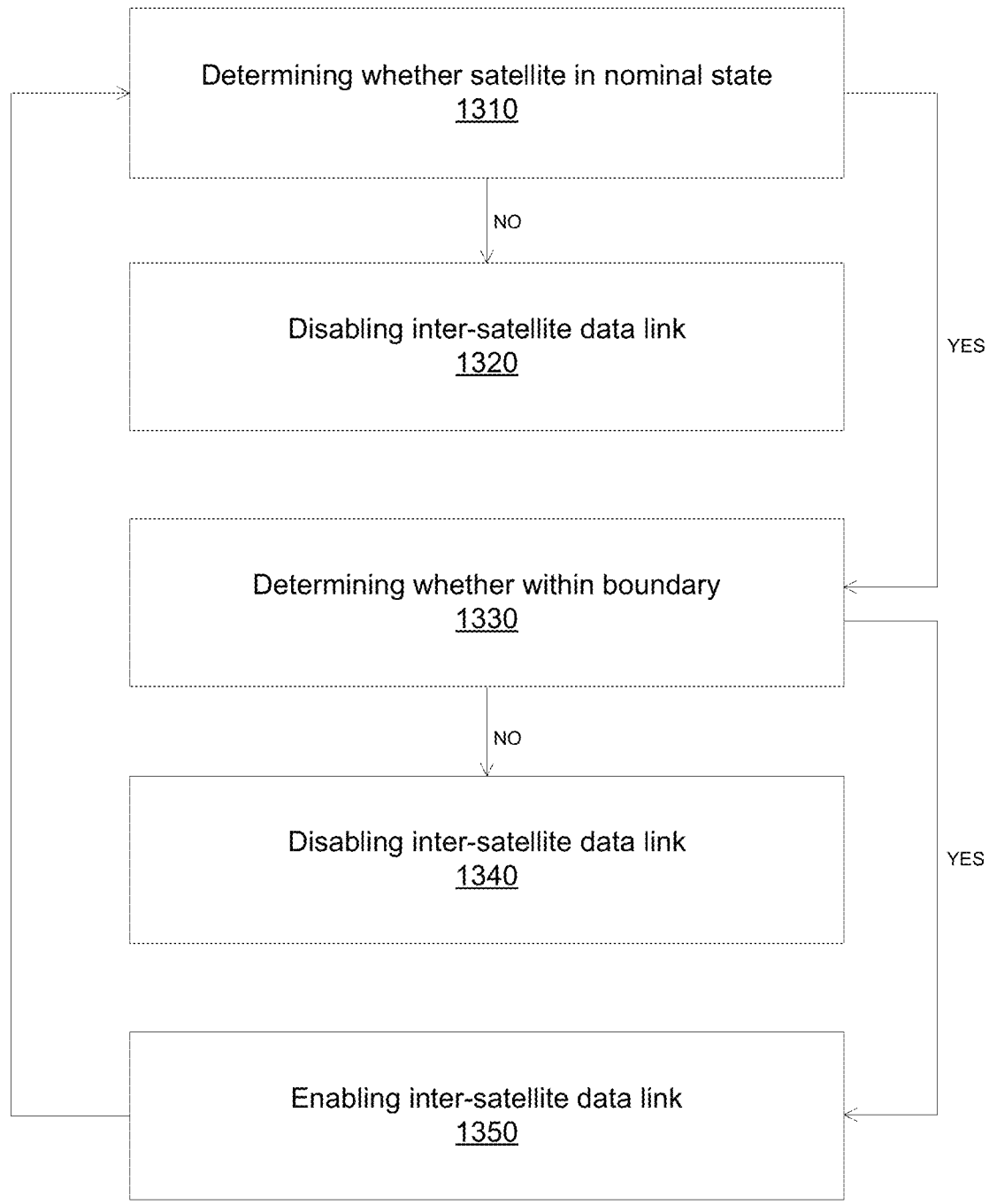
FIGS. 13A-B depict flow diagrams for determining satellite data transmission, according to at least one embodiment.
Figure 13B:
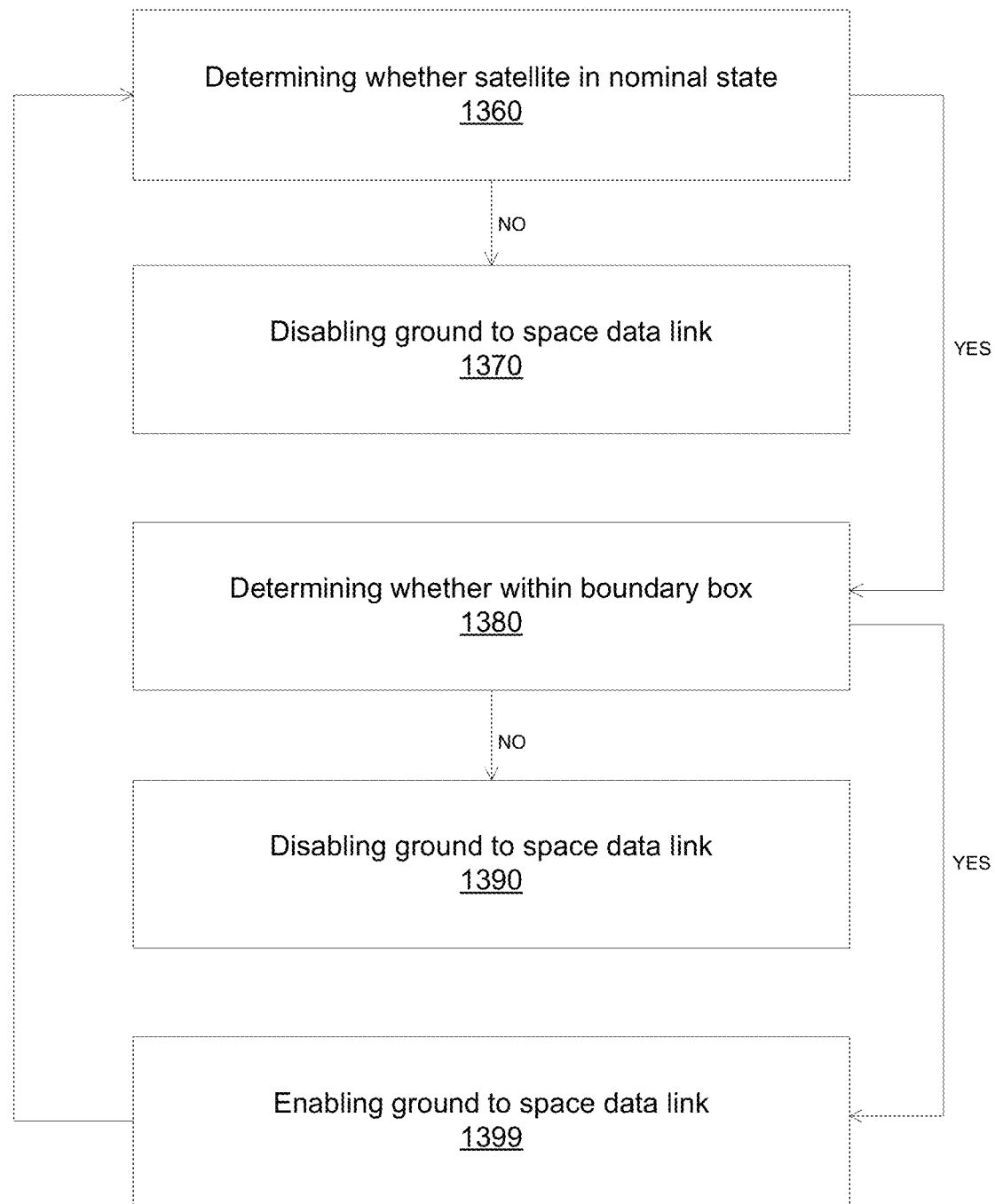

FIGS. 13A-B depict flow diagrams for determining satellite data transmission, according to at least one embodiment. In FIG. 13A, operation 1310 may determine whether a satellite is in a nominal state. If the satellite is not in a nominal state, communications payload data transmission may not be enabled; operation 1320 may disable inter-satellite data link. However, if the satellite is in a nominal state, then operation 1330 may determine whether the satellite's orbital location is within a communication boundary box. If the satellite is not within a communication boundary box, then communications payload data transmission may not be enabled; operation 1340 may disable inter-satellite data link. However, if the satellite is within a communication boundary box, then operation 1350 may enable inter-satellite data link. In some embodiments, the method may repeat.

In FIG. 13B, operation 1360 may determine whether a satellite is in a nominal state. If the satellite is not in a nominal state, communications payload data transmission may not be enabled; operation 1370 may disable ground to space data link. However, if the satellite is in a nominal state, then operation 1380 may determine whether the satellite's orbital location is within a communication boundary box. If the satellite is not within a communication boundary box, then communications payload data transmission may not be enabled; operation 1290 may disable ground to space data link. However, if the satellite is within a communication boundary box, then operation 1399 may enable ground to space data link. In some embodiments, the method may repeat.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium, and/or may be performed in any order. The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

What is claimed is:
1. A communication system, comprising:
one or more satellites disposed in one or more orbital planes,
wherein the satellites are disposed at a fixed distance interval and a fixed altitude interval;
at least two terminals positioned at end sections of a plurality of satellites,
wherein the terminals are located at or above a predetermined minimum latitude,
wherein the earth's circumference is inversely proportional to latitude,
wherein the plurality of satellites are configured to provide bi-directional communication between the two terminals, wherein data transmission between the terminals is based solely on geographic data of the terminals;
an optimal pathway comprising at least one of a straight line and a theoretical pathway; and
a machine-generated boundary box comprising maximum and minimum latitudes and maximum and minimum longitudes of a satellite within which data transmission between the terminals is permitted.

2. The communication system of claim 1, further comprising:
wherein the optimal pathway is determined based on transmitting and receiving satellites' position and orientation, distance, and electromagnetic visibility.

3. The communication system of claim 1, further comprising:
wherein the straight line comprises an arc between the terminals that does not intersect the surface of the earth.

4. The communication system of claim 1, further comprising:
wherein the theoretical pathway comprises a plurality of line segments and at least one vertex, and
wherein the vertex comprises a change in direction of the theoretical pathway.

5. The communication system of claim 1, further comprising:
wherein the theoretical pathway is the shortest distance between the terminals based on at least one of a geography data and a topology data of the earth.

6. The communication system of claim 1, further comprising:
wherein the theoretical pathway travels in the east or the west direction when it is highest in latitude.

7. The communication system of claim 1, further comprising:
wherein size of the boundary box is inversely proportional to total number of satellites in the system.

8. The communication system of claim 1, further comprising:
wherein longitudinal boundaries of the boundary box remain constant throughout the optimal pathway.

9. A communication system, comprising:
a constellation of satellites fixed in position and orientation disposed in a plurality of orbital planes,
wherein the constellation is configured to provide coverage between two terminals by directing data north or south of a predetermined latitude for minimizing a distance between the two terminals,
wherein data transmission between the terminals does not comprise at least one of a processing and an analysis of the data;
an optimal pathway comprising at least one of a straight line and a theoretical pathway;
an algorithm-generated boundary box within which transmission between the terminals is permitted, and
wherein an area of the boundary box comprises all possible communication pathways permitted that approximates the optimal pathway.

10. The communication system of claim 9, further comprising:
wherein the straight line is the shortest distance between the terminals.

11. The communication system of claim 9, further comprising:
wherein the theoretical pathway comprises a change in north-south direction that is greater than the change in east-west direction when it is below a minimum threshold latitude, and
wherein the theoretical pathway comprises a change in east-west direction that is greater than the change in north-south direction when it is above the minimum threshold latitude.

12. The communication system of claim 9, further comprising:
wherein the predetermined latitude is 45-degrees.

13. The communication system of claim 9, further comprising:
wherein edges surrounding the boundary box comprise maximum latitudes and longitudes permitted in a communication pathway.

14. The communication system of claim 9, further comprising:
wherein latitude edges of the boundary box decrease and approach the optimal pathway when additional satellites are added to the constellation.

15. The communication system of claim 9, further comprising:
wherein multiple alternate pathways transmit overlapping data between the terminals for preventing a gap in transmission and a confirmation of data.

16. A communication system comprising:
a first satellite communicatively coupled to a first terminal through a first link;
a second satellite communicatively coupled to a second terminal through a second link,
wherein the first satellite is communicatively coupled to the second satellite through a crosslink configured to provide bi-directional communication between the first terminal and the second terminal,
wherein data transmission between the terminals does not comprise converting to an electrical signal,
wherein the first satellite forms a new connection with the second satellite prior to dropping a previous connection for maintaining continuous connectivity;
an optimal pathway comprising at least one of a straight line and a theoretical pathway,
wherein the first satellite and the second satellite are configured to arrive along the optimal pathway at a predetermined time interval;
a boundary box within which data transmission between the terminals is permitted, and
wherein an actual pathway taken is the most accurate approximation of the optimal pathway at any given time.

17. A communication system comprising:
a first satellite communicatively coupled to a first terminal through a first link;
a second satellite communicatively coupled to a second terminal through a second link,
wherein the first satellite is communicatively coupled to the second satellite through a crosslink configured to provide bi-directional communication between the first terminal and the second terminal,
wherein data transmission between the terminals does not comprise converting to an electrical signal,
wherein the first satellite forms a new connection with the second satellite prior to dropping a previous connection for maintaining continuous connectivity;
an optimal pathway comprising at least one of a straight line and a theoretical pathway,
wherein the first satellite and the second satellite are configured to arrive along the optimal pathway at a predetermined time interval;
a boundary box within which data transmission between the terminals is permitted, and wherein the theoretical pathway travels generally in the north or south directions when it is below a predetermined latitude, and wherein the theoretical pathway travels generally in the east or west directions when it is above the predetermined latitude.

18. A communication system comprising:

a first satellite communicatively coupled to a first terminal through a first link;

a second satellite communicatively coupled to a second terminal through a second link, wherein the first satellite is communicatively coupled to the second satellite through a crosslink configured to provide bi-directional communication between the first terminal and the second terminal, wherein data transmission between the terminals does not comprise converting to an electrical signal, wherein the first satellite forms a new connection with the second satellite prior to dropping a previous connection for maintaining continuous connectivity;

an optimal pathway comprising at least one of a straight line and a theoretical pathway, wherein the first satellite and the second satellite are configured to arrive along the optimal pathway at a predetermined time interval;

a boundary box within which data transmission between the terminals is permitted, and wherein the size of the boundary box is dynamic based on constellation size.

\* \* \* \* \*